(12) United States Patent
Maeda et al.

(10) Patent No.: US 8,688,725 B2
(45) Date of Patent: Apr. 1, 2014

(54) SEARCH APPARATUS, SEARCH METHOD, AND PROGRAM

(75) Inventors: Yoshinori Maeda, Kanagawa (JP); Hitoshi Honda, Kanagawa (JP)

(73) Assignee: Sony Corporation (JP)

( * ) Notice: Subject to any disclaimer, the term of this patent is extended or adjusted under 35 U.S.C. 154(b) by 106 days.

(21) Appl. No.: 13/198,158

(22) Filed: Aug. 4, 2011

(65) Prior Publication Data

US 2012/0041947 A1 Feb. 16, 2012

(30) Foreign Application Priority Data

Aug. 12, 2010 (JP) ................ P2010-180944

(51) Int. Cl.
*G06F 17/30* (2006.01)
*G10L 15/00* (2013.01)

(52) U.S. Cl.
USPC .................. 707/758; 704/251; 704/254

(58) Field of Classification Search
USPC .......................... 707/758; 704/251
See application file for complete search history.

(56) References Cited

U.S. PATENT DOCUMENTS

| | | | |
|---|---|---|---|
| 6,345,252 | B1 | 2/2002 | Beigi et al. |
| 6,345,253 | B1 | 2/2002 | Viswanathan |
| 6,421,645 | B1 | 7/2002 | Beigi et al. |
| 6,757,657 | B1* | 6/2004 | Kojima et al. ............... 704/275 |
| 7,013,277 | B2 | 3/2006 | Minamino et al. |
| 7,460,610 | B2 | 12/2008 | Matsumoto |
| 2003/0050779 | A1* | 3/2003 | Riis et al. .................... 704/236 |
| 2004/0083108 | A1* | 4/2004 | Tachimori et al. ........... 704/270 |

FOREIGN PATENT DOCUMENTS

| | | |
|---|---|---|
| JP | 2000-348064 A | 12/2000 |
| JP | 2001-242884 A | 9/2001 |
| JP | 2003-348064 A | 12/2003 |

OTHER PUBLICATIONS

Iwasa, T., & Kita, K. Error Correction of Speech Recognition Outputs Using Generalized LR Parsing and Confusion Matrix, 2003.*
Samsudin, N. H., & Kong, T. E. (2004). A Simple Malay Speech Synthesizer Using Syllable Concatenation Approach. In MMU International Symposium on Information and Communications Technologies.*
Sugamura, N. (Apr. 1990). Continuous speech recognition using large vocabulary word spotting and CV syllable spotting. In Acoustics, Speech, and Signal Processing, 1990.*

* cited by examiner

*Primary Examiner* — James Trujillo
*Assistant Examiner* — William Spieler
(74) *Attorney, Agent, or Firm* — Lerner, David, Littenberg, Krumholz & Mentlik, LLP

(57) ABSTRACT

A search apparatus includes: a speech recognition unit that recognizes an input voice; a matching unit that matches a plurality of strings of search result target words; a generation unit that generates a string of search result words; a selecting unit that selects emphasis target words that are the targets to be emphasized in the words of the string of search result words, on the basis of the matching result with the string of search result target words, and a pronunciation symbol-to-word table in which the pronunciation symbols and the words are made to correspond to each other; and a conversion unit that converts the string of search result words into the string of emphasis words in which the emphasis target words are emphasized in the words of the string of search result words.

9 Claims, 20 Drawing Sheets

FIG. 7

| UTTERANCE |
|---|
| SEKAI/ISAN (WORLD HERITAGE) |

⇕ MATCHING

| PROGRAM TITLE | COSINE DISTANCE | FIRST CORRECTED DISTANCE | SECOND CORRECTED DISTANCE |
|---|---|---|---|
| ZA/SEKAI/ISAN/TOSHI/NO/ISAN/SUPESHARU/ITARIA/ITARIA/ROMA/BENECHIA (THE FEATURE PROGRAM ABOUT THE HERITAGE OF WORLD HERITAGE CITIES, ROME AND VENICE, ITALY) | 0.4472 | 0.6687 | 1 |
| SEKAI/JOSEI (WORLD SITUATION) | 0.5 | 0.5 | 0.5 |

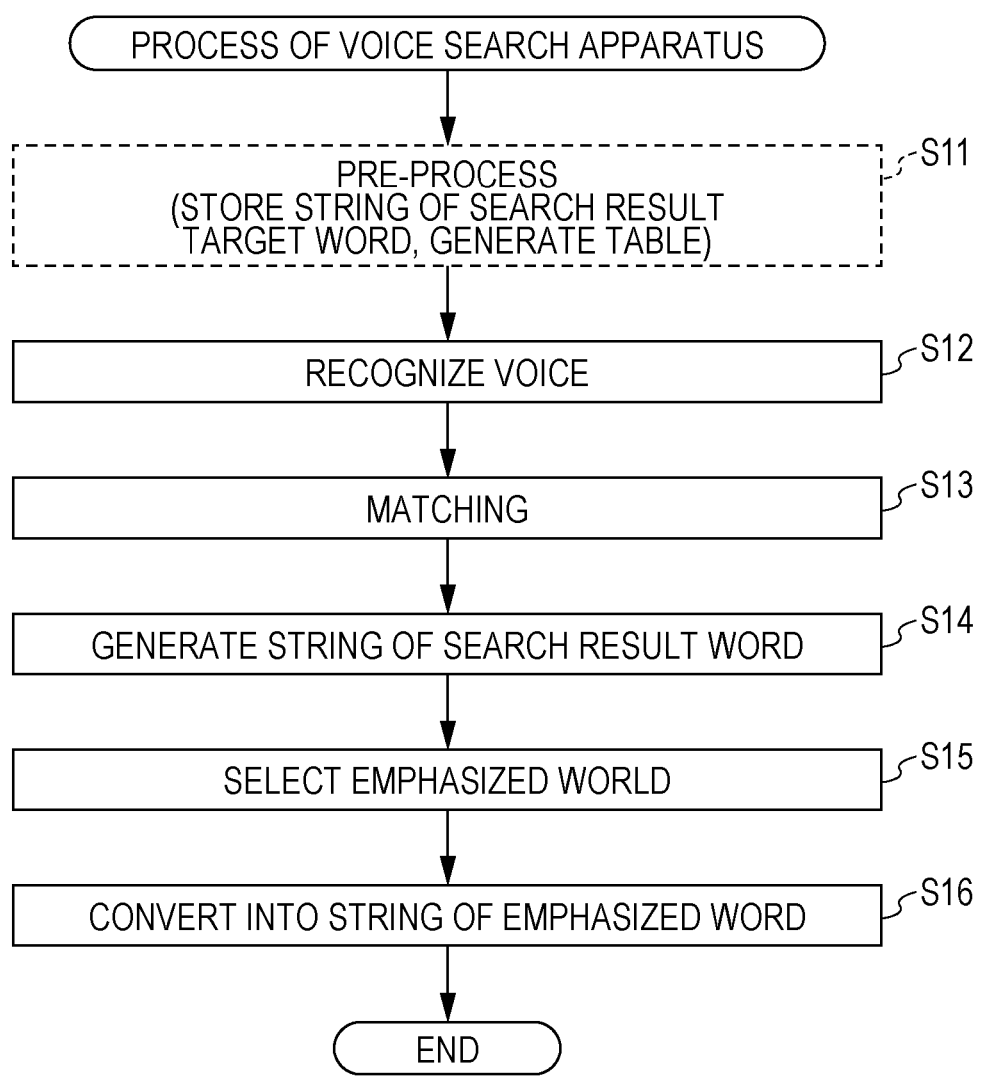

FIG. 10

STRING OF SEARCH RESULT TARGET WORD : TOSHI NO SE KAISAI (BREAKING UP FOR THE END OF THE YEAR)

PRONUNCIATION SYMBOL (STRING) : TOSHINOSEKAISAN

PRONUNCIATION SYMBOL OF CORRESPONDING UNIT : TOSHI SHINO NOSE SEKA KAI ISA SAN
(TWO-SYLLABLE CATENATION)

```
TOSHI  : TOSHI NO SE (THE END OF THE YEAR)
SHINO  : TOSHI NO SE (THE END OF THE YEAR)
NOSE   : TOSHI NO SE (THE END OF THE YEAR)
SEKA   : TOSHI NO SE (THE END OF THE YEAR)
KAI    : KAISAN (BREAKING UP)
ISA    : KAISAN (BREAKING UP)
SAN    : KAISAN (BREAKING UP)
```
⎫ PRONUNCIATION SYMBOL-TO-WORD TABLE

FIG. 11

"SEKAI ISAN GENTEN E NO KAIKI"
(RETURNING TO WORLD HERITAGE STARTING POINT)

| MORPHEME ANALYSIS RESULT | NUMBER OF PRONUNCIATION SYMBOLS |
|---|---|
| SEKAI (WORLD) | 3 |
| ISAN (HERITAGE) | 3 |
| GENTEN (STARTING POINT) | 4 |
| E (TO) | 1 |
| NO (OF) | 1 |
| KAIKI (RETURNING) | 3 |

| CORRESPONDING UNIT | | |
|---|---|---|
| 3 { | SEKA | .. SEKAI (WORLD) |
|  | KAI | .. SEKAI (WORLD) |
|  | I I | .. SEKAI (WORLD) |
| 3 { | ISA | .. ISAN (HERITAGE) |
|  | SAN | .. ISAN (HERITAGE) |
|  | NGE | .. ISAN (HERITAGE) |
| 4 { | GEN | .. GENTEN (STARTING POINT) |
|  | NTE | .. GENTEN (STARTING POINT) |
|  | TEN | .. GENTEN (STARTING POINT) |
|  | N E | .. GENTEN (STARTING POINT) |
| 1 { | ENO | .. E (TO) |
| 1 { | NOKA | .. NO (OF) |
| 3 { | KAI | .. KAIKI (RETURNING) |
|  | IKI | .. KAIKI (RETURNING) |

PRONUNCIATION SYMBOL-TO-WORD TABLE

| CORRESPONDING UNIT | WORD |
|---|---|
| SEKA | .. SEKAI (WORLD) |
| KAI | .. SEKAI (WORLD), KAIKI (RETURNING) |
| I I | .. SEKAI (WORLD) |
| ISA | .. ISAN (HERITAGE) |
| SAN | .. ISAN (HERITAGE) |
| NGE | .. ISAN (HERITAGE) |
| GEN | .. GENTEN (STARTING POINT) |
| NTE | .. GENTEN (STARTING POINT) |
| TEN | .. GENTEN (STARTING POINT) |
| N E | .. GENTEN (STARTING POINT) |
| ENO | .. E (TO) |
| NOKA | .. NO (OF) |
| IKI | .. KAIKI (RETURNING) |

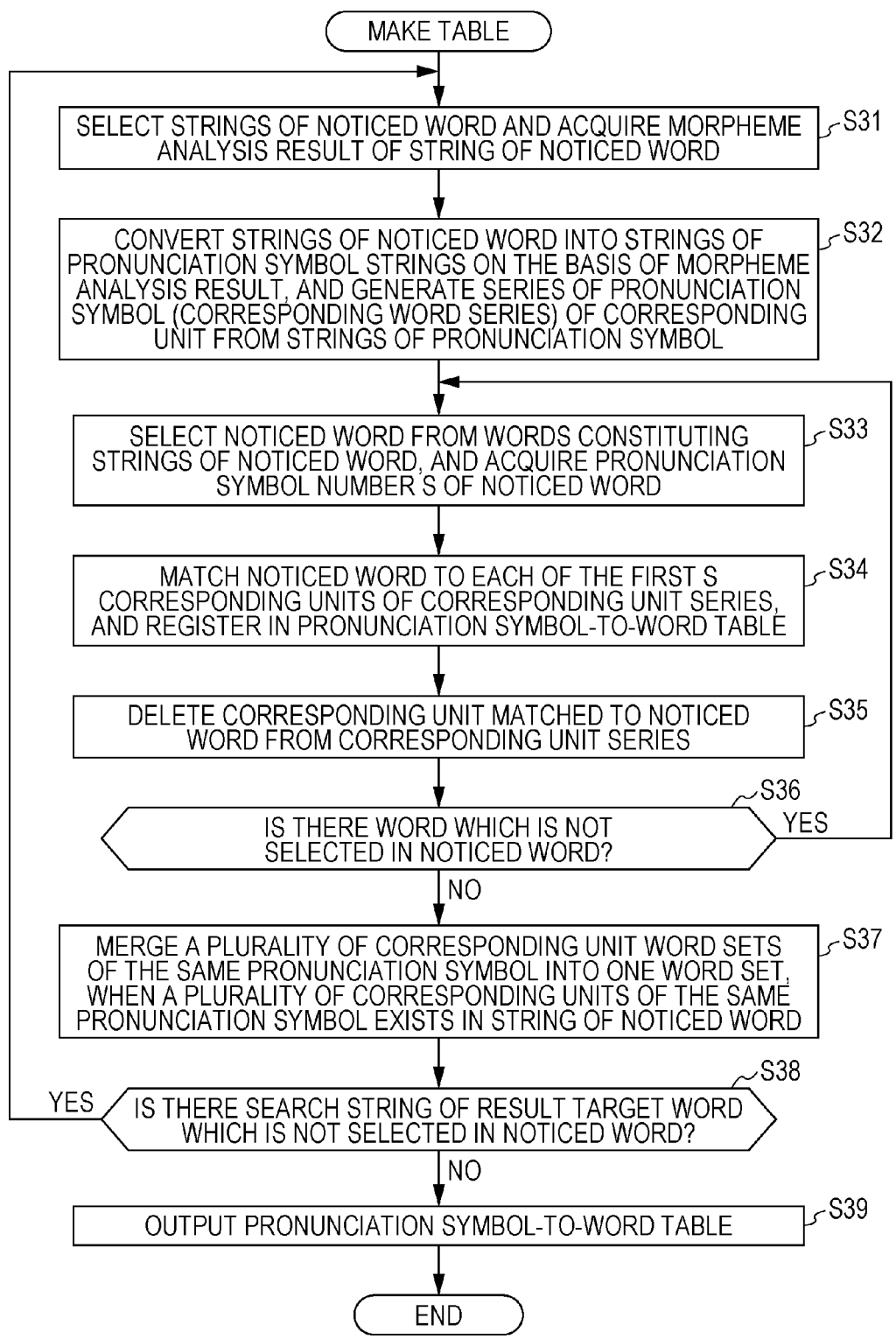

FIG. 13

"SEKAI ISAN GENTEN E NO KAIKI"
(RETURNING TO WORLD
HERITAGE STARTING POINT)

| CORRESPONDING UNIT |
|---|
| S E K A |
| K A I |
| I |
| I S A |
| S A N |
| N G E |
| G E N |
| N T E |
| T E N |
| N E |
| E N O |
| N O K A |
| K A I |
| I K I |

CUT FIRST CHARACTER

ONE CHARACTER TAG SERIES

MORPHEME ANALYSIS RESULT          TAG

SEKAI (WORLD)         SE .. SEKAI (WORLD)
ISAN (HERITAGE)       KA .. SEKAI (WORLD)
GENTEN                I  .. ISAN (HERITAGE)
(STARTING POINT)      SA .. ISAN (HERITAGE)
E (TO)                N  .. ISAN (HERITAGE)
NO (OF)               GE .. GENTEN (STARTING POINT)
KAIKI                 N  .. GENTEN (STARTING POINT)
(RETURNING)           TE .. GENTEN (STARTING POINT)
                      N  .. GENTEN (STARTING POINT)
                      E  .. E (TO)
                      NO .. NO (OF)
                      KA .. KAIKI (RETURNING)
                      I  .. KAIKI (RETURNING)

PRONUNCIATION SYMBOL-TO-WORD TABLE

CORRESPONDING UNIT        WORD

SEKA .. SEKAI (WORLD)
KAI  .. SEKAI (WORLD), KAIKI (RETURNING)
I    .. SEKAI (WORLD)
ISA  .. ISAN (HERITAGE)
SAN  .. ISAN (HERITAGE)
NGE  .. ISAN (HERITAGE)
GEN  .. GENTEN (STARTING POINT)
NTE  .. GENTEN (STARTING POINT)
TEN  .. GENTEN (STARTING POINT)
NE   .. GENTEN (STARTING POINT)
ENO  .. E (TO)
NOKA .. NO (OF)
IKI  .. KAIKI (RETURNING)

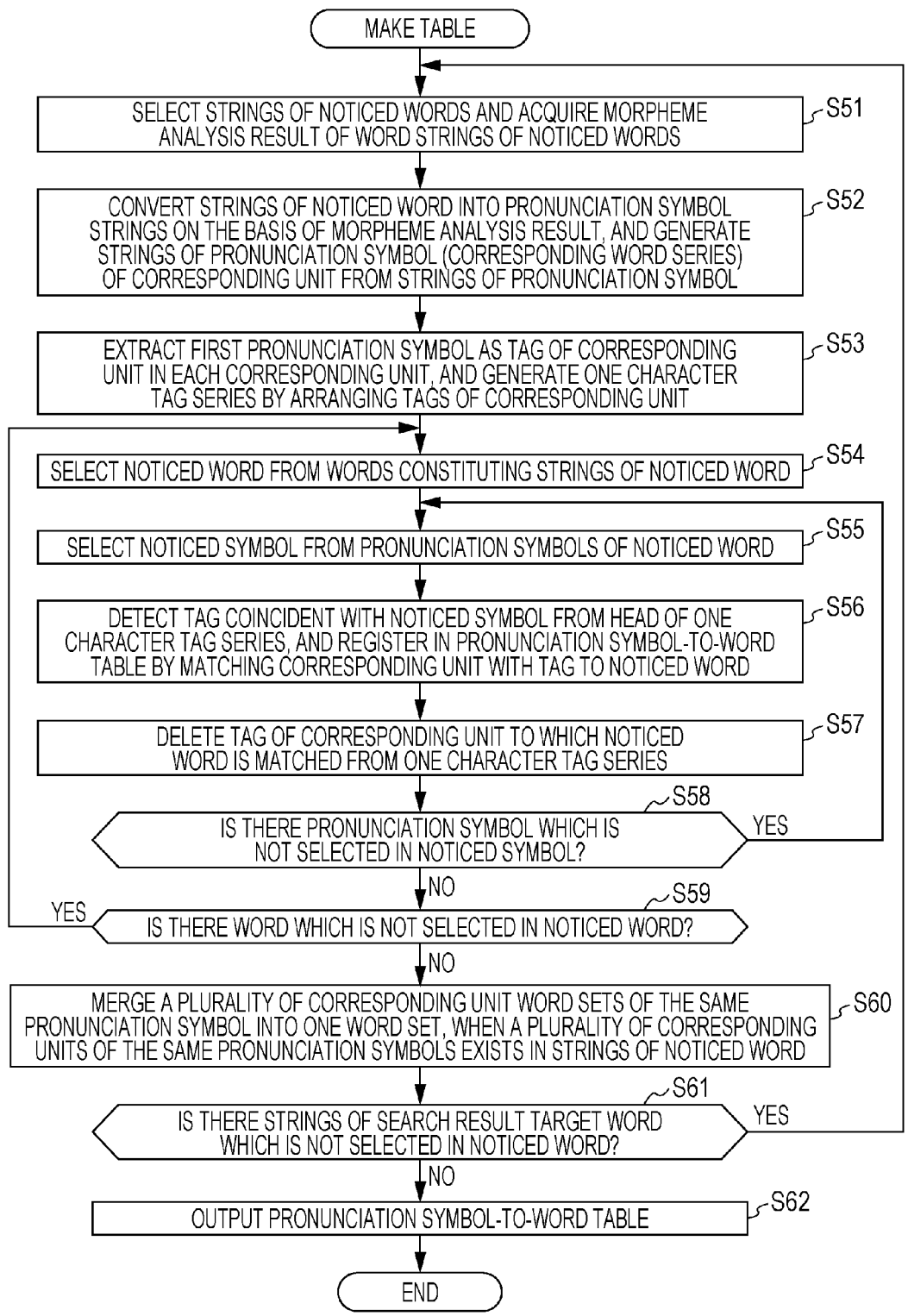

FIG. 15

"SEKAI ISAN GENTEN E NO KAIKI"
(RETURNING TO WORLD HERITAGE STARTING POINT)

CORRESPONDING UNIT

SEKAI
KAII
IISA
ISAN
SANGE
NGEN
GENTE
NTEN
TENE
N ENO
ENOKA
NOKAI
KAIKI

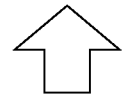

PRONUNCIATION SYMBOL-TO-WORD TABLE

| | | |
|---|---|---|
| SEKAI | : | SEKAI (WORLD) |
| KAII | : | SEKAI (WORLD) |
| IISA | : | SEKAI (WORLD) |
| ISAN | : | ISAN (HERITAGE) |
| SANGE | : | ISAN (HERITAGE) |
| NGEN | : | ISAN (HERITAGE) |
| GENTE | : | GENTEN (STARTING POINT) |
| NTEN | : | GENTEN (STARTING POINT) |
| TENE | : | GENTEN (STARTING POINT) |
| N ENO | : | GENTEN (STARTING POINT) |
| ENOKA | : | E (TO) |
| NOKAI | : | NO (OF) |
| KAIKI | : | KAIKI (RETURNING) |

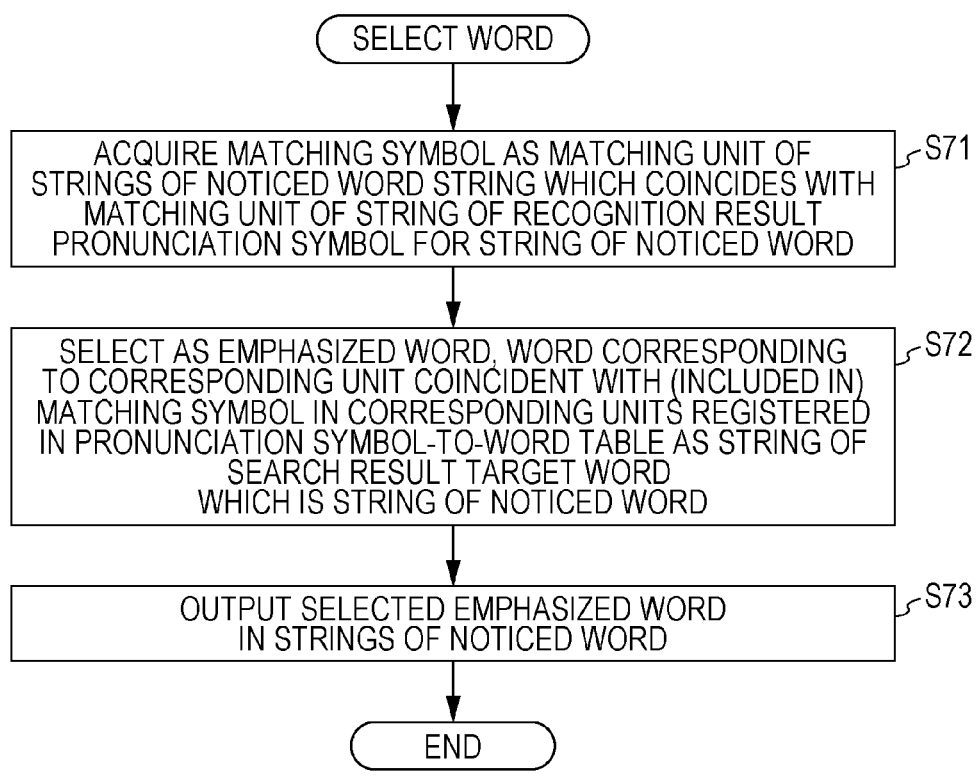

FIG. 17

PRONUNCIATION SYMBOL-TO-WORD TABLE

- CORRESPONDING UNIT (TWO-VOICE CATENATION) AND
  WORD IN "ZA SEKAI ISAN (THE WORLD HERITAGE)"

ZASE .. THE
  SEKA .. SEKAI (WORLD)
  KAI  .. SEKAI (WORLD)
  II   .. ISAN (HERITAGE)
  ISA  .. ISAN (HERITAGE)
  SAN  .. ISAN (HERITAGE)

- CORRESPONDING UNIT AND WORD IN "SEKAI ISAN GENTEN E NO KAIKI
  (RETURNING TO THE WORLD HERITAGE STARTING POINT)"

SEKA .. SEKAI (WORLD)
  KAI  .. SEKAI (WORLD), KAIKI (RETURNING)
  ISA  .. ISAN (HERITAGE)
  SAN  .. ISAN (HERITAGE)
  NGE  .. ISAN (HERITAGE)
  GEN  .. GENTEN (STARTING POINT)
  NTE  .. GENTEN (STARTING POINT)
  TEN  .. GENTEN (STARTING POINT)
  N E  .. GENTEN (STARTING POINT)
  ENO  .. E (TO)
  NOKA .. NO (OF)
  IKI  .. KAIKI (RETURNING)

- CORRESPONDING UNIT AND WORD IN "SOKUHOU TOSHI NO SE NI KAISAN
  (FLASH NEWS BREAKING UP IN THE END OF THE YEAR)"

SOKU  .. SOKUHOU (FLASH NEWS)
  KUHO  .. SOKUHOU (FLASH NEWS)
  HOU   .. SOKUHOU (FLASH NEWS)
  UTO   .. SOKUHOU( FLASH NEWS)
  TOSHI .. TOSHI NO SE (THE END OF THE YEAR)
  SHINO .. TOSHI NO SE (THE END OF THE YEAR)
  NOSE  .. TOSHI NO SE (THE END OF THE YEAR)
  SENI  .. TOSHI NO SE (THE END OF THE YEAR)
  NIKA  .. NI (IN)
  KAI   .. KAISAN (BREAKING UP)
  ISA   .. KAISAN (BREAKING UP)
  SAN   .. KAISAN (BREAKING UP)

FIG. 18

WARATTE IITOMO
WARATTE IITOMO ZOUKAN GOU
WARATTE IITOMO KURISUMASU IBU TOKUDAI GOU
WARATTE IITOMO NISENHATCHI HARU NO SAITEN SUPESHARU
WARATTE IITOMO NISENHATCHI AKI NO SAITEN SUPESHARU
DOYOU DRAMA AKAI ITO ZERONI
DOYOU DRAMA AKAI ITO ZEROSAN
EIGA RENZOKU DORAMA AKAI ITO NO SEKAI
KANGORONGO WAGA ITOSHI NO CHUKO MANSHON
GINTAMA AWANAITO WAKARANAI KOTO MO ARU
CHUUGAKUSEI NIKKI KONO ITOSIKI SEKAI HE
KOKORO NO JIDAI SHUUKYOU JINSEI TO TOMO NI INORI TOMO NI HORU
JYUI IGAMI NANAO NO SATSUJIN KARUTE
DOYO DRAMA AKAI ITO ZEROICHI
HAKKEN TANKEN DAISUKI SIMAJIROU ATARASHII TOMODACHI
EIGO DE SHABERANAITO JUNIA KAKKO II MYUJISHAN WO MEZASE
SIRIZU SEKAI ISAN HYAKU KODAI TOSHI PARENKE MEKISHIKO
SIRIZU SEKAI ISAN HYAKU HABANA KYU SHIGAI TO YOUSAI KYUBA
ZA SEKAI ISAN SEGOBIA KYU SHIGAI TO ROMA SUIDOU BASHI SUPEIN
ANIME SUPONJI BOBU SHU KANIBAGA KINNSHI REI ITOKO NO SUTANRI

FIG. 19

WARATTE [IITOMO]
WARATTE [IITOMO] ZOUKAN GOU
WARATTE [IITOMO] KURISUMASU IBU TOKUDAI GOU
WARATTE [IITOMO] NISENHATCHI HARU NO SAITEN SUPESHARU
WARATTE [IITOMO] NISENHATCHI AKI NO SAITEN SUPESHARU
DOYOU DRAMA [AKAI ITO] ZERONI
DOYOU DRAMA [AKAI ITO] ZEROSAN
EIGA RENZOKU DORAMA [AKAI ITO] NO SEKAI
KANGORONGO WAGA [TOSHI] NO CHUKO MANSHON
GINTAMA AWA [NAITO] WAKARANAI KOTO MO ARU
CHUUGAKUSEI NIKKI KONO [TOSIKI] SEKAI HE
KOKORO NO JIDAI SHUUKYOU JINSEI TO TOMO NI JINORI [TOMO] NI HORU
[JYUJI] GAMI NANAO NO SATSUJIN KARUTE
DOYO DRAMA [AKAI ITO] ZEROICHI
HAKKEN TANKEN DAISUKI SIMAJIROU [ATARASHII TOMODACHI]
EIGO DE SHABERA [NAITO] JUNIA KAKKO II MYUJISHAN WO MEZASE
SIRIZU [SEKAI] ISAN HYAKU [KODAI] TOSHI PARENKE MEKISHIKO
SIRIZU [SEKAI] ISAN HYAKU HABANA KYU [SHIGAI] TO YOUSAI KYUBA
ZA [SEKAI] ISAN SEGOBIA KYU [SHIGAI] TO ROMA SUIDOU BASHI SUPEIN
ANIME SUPONJI BOBU SHU KANIBAGA [KINNSHI REI ITOKO] NO SUTANRI

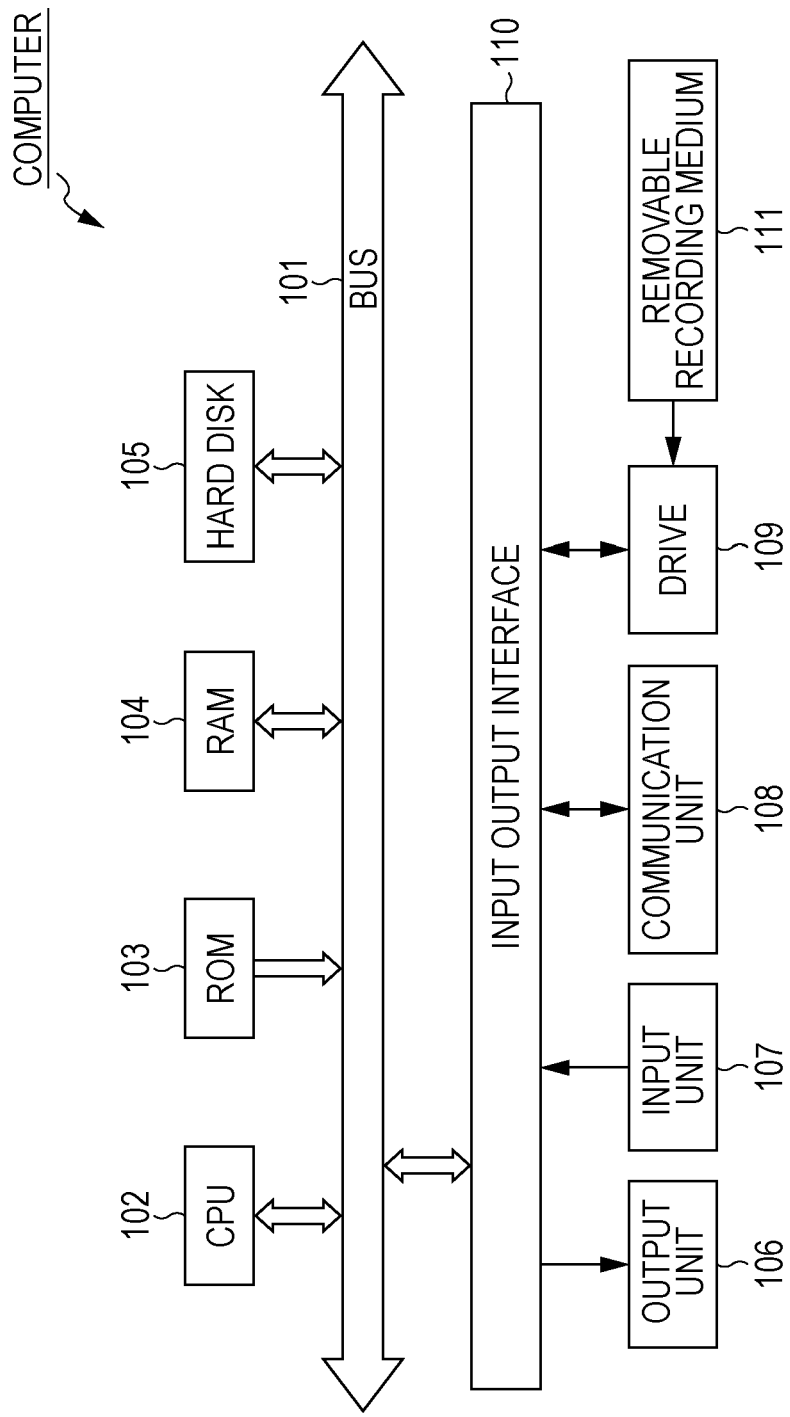

SEARCH APPARATUS, SEARCH METHOD, AND PROGRAM

CROSS-REFERENCE TO RELATED APPLICATION

The present application claims priority from Japanese Patent Application No. JP 2010-180944 filed in the Japanese Patent Office on Aug. 12, 2010, the entire content of which is incorporated herein by reference.

BACKGROUND

The present disclosure relates to a search apparatus, a search method, and a program, particularly, a search apparatus, a search method, and a program which make it possible to provide a convenient search result in voice search.

As a method of voice search that searches a string of words such as texts corresponding to a voice by using a voice input by a user, there is a method that uses a speech recognition apparatus alone (for example, see Japanese Unexamined Patent Application No. 2001-242884).

In the voice search using a speech recognition apparatus alone, an input voice is recognized with a line of words (vocabularies) registered in advance as the target of speech recognition result, such that the speech recognition result is output as a string of search result words that is the result of searching the string of words corresponding to the input voice.

Therefore, in the voice search using only the speech recognition apparatus, the string of words (also called a string of search result target words) that is the target of the search result of the string of words corresponding to the input voice is only a string of words (including one word herein) that is a line of words registered in advance in the dictionary as the target of the speech recognition result, such that the user's utterance is limited to the line of words registered in the dictionary to be used for speech recognition.

Recently, a method of voice search that is called voice search has been proposed.

In the voice search, a language model, such as N-gram, is used to perform continuous speech recognition, and the speech recognition result is matched with a text registered in a database (DB) prepared separately from a dictionary used for speech recognition (a text corresponding to the speech recognition result is searched from texts registered in the DB).

Further, the uppermost-ranked text or a text within the upper-N rank, which is matched with the speech recognition result, is output as a string of search result words, on the basis of the matching result.

In the voice search, since the text registered in the DB prepared separately from a dictionary used for speech recognition becomes the string of search result target words, it is possible to perform voice search, with a plurality of texts as strings of search result target words, by registering the texts in the DB.

In other words, according to the voice search, it is possible to perform voice search with some degree of accuracy within the texts registered in the DB as the strings of search result target words, even if a user utters words other than the words registered in a dictionary used for the speech recognition.

On the other hand, a method has been proposed in which texts for indexing is generated based on the voice in the multimedia file by performing speech recognition on the multimedia file storing voice and images and the voice in the multimedia file is searched based on the speaker identification (for example, Japanese Unexamined Patent Application No. 2003-348064).

SUMMARY

Meanwhile, according to search sites (Google and the like) provided on Web, when a user inputs a keyword, the search result for the keyword is displayed on the browser, while the parts corresponding to the keyword is displayed and emphasized (emphasized) in the search result.

Text search for the keyword is performed on the search site and the texts completely matching in notation with the keyword in the result of the text search are emphasized and displayed, as parts corresponding to the keyword.

Further, the texts equivalent to the keyword in notation in the result of the text search are also emphasized, as parts corresponding to the keyword, on the search site.

In detail, for example, when a text "SO NI I" that is equivalent in notation to a keyword "Sony" is included in the text search result for the keyword "Sony", the text "SO NI I" is also emphasized and displayed as a part corresponding to the keyword.

As described above, it is possible to provide convenient search result by displaying and emphasizing the parts corresponding to the keyword in the search result.

That is, with the search result displaying and emphasizing the parts corresponding to a keyword, the user can see the reason that the search result is searched, such that it is possible to prevent the user from feeling stress due to the fact that the user does not know the reason that the search result is searched.

Further, with the search result displaying and emphasizing the parts corresponding to a keyword, the user can intuitively and quickly find a desired search result from a plurality of search results.

Similarly, in the voice search, it is possible to provide a convenient search result (a string of search result words) by displaying and emphasizing the parts matching (completely or partially) in notation with the voice search result in the text search, as the part corresponding to the input voice in the string of search result words that is the text search result of a speech recognition result for an input voice, from a string of search result target words.

In other words, for example, a user utters "ROMA (Rome)" as an input voice and a text "SEKAI ISAN TOSHI NO ISAN ITARIA ROMA BENECHIA NAPORI FIRENTSE (heritage of a world heritage cities, Rome, Venice, Naples and Florence, Italy)" is acquired as a string of search result words searching the text "ROMA (Rome)" from the voice search result.

In particular, when for texts having a number of characters, such as the string of search result words "SEKAI ISAN TOSHI NO ISAN ITARIA ROMA BENECHIA NAPORI FIRENTSE", the parts corresponding to the input voice are not emphasized and the user has a difficulty in finding texts "ROMA" matched with the speech recognition result for the input voice at a glance, such that the user may feel stress without knowing the reason that the text "SEKAI ISAN TOSHI NO ISAN ITARIA ROMA BENECHIA NAPORI FIRENTSE" is searched.

When the string of search result words "SEKAI ISAN TOSHI NO ISAN ITARIA ROMA BENECHIA NAPORI FIRENTSE" is displayed with the "ROMA", the part corresponding to the input voice, emphasized, such as "SEKAI ISAN TOSHI NO ISAN ITARIA "ROMA" BENECHIA NAPORI FIRENTSE (heritage of a world heritage cities, "Rome", Venice, Naples and Florence, Italy)", the user can find the text "ROMA" matching with the speech recognition result of the input voice at a glance and can easily grasp the reason that the string of texts "SEKAI ISAN TOSHI NO ISAN ITARIA ROMA BENECHIA NAPORI FIRENTSE" is searched.

However, in the voice search, when the parts (texts) matching with the speech recognition result in notation in the text search in the string of search result words, which is acquired as a result of text search for the speech recognition result of an input voice, is emphasized and displayed as the part corresponding to the input voice, the parts may not be appropriately emphasized an displayed, depending on the speech recognition result of the input voice.

That is, for example, when an incorrect speech recognition result "TOSHI NO SE KAISAN (dissolution of Diet at the end of year)" is acquired for an input voice "TOSHI NO SEKAI ISAN (world heritage in a city)", even if a text "SEKAI ISAN (world heritage)" or "SEKAI NO TOSHI (city of world)" that (completely or partially) matches with the input voice is included in the string of search result words acquired by text search for the speech recognition result "TOSHI NO SE KAISAN (dissolution of Diet at the end of the year)", the notation or the text "world heritage" or "SEKAI NO TOSHI" does not matches with the speech recognition result "TOSHI NO SE KAISAN", such that the text is not emphasized and it is difficult to achieve a convenient search result.

Further, even if the speech recognition result is not incorrect, the parts corresponding to the input voice may not be emphasized and displayed.

That is, for example, when a user utters "TO-SHI-NO-SE-KA-I ("TO-SHI-NO-SE-KA-I" has several meanings")", even if any one of "TOSHI NO SEKAI (city of world)" and "TOSHI NO SE KAI ("TOSHI NO SE" means "at the end of year," and "KAI" has no meaning)" is acquired, the speech recognition result is not be considered as being incorrect.

Further, when a speech recognition result "TOSHI NO SE KAI" is acquired for an input voice "TO-SHI-NO-SE-KA-I" that is intended to be said as "city of world" by the user, even if a text "city of world" matching with the (notation of) input voice is included in the string of search result words acquired by the text search for the speech recognition result "TOSHI NO SE KAI", the text "world of city" does not match with the speech recognition result "TOSHI NO SE KAI", such that it is not emphasized and it is difficult to acquire convenient search result.

The present disclosure has been made in view of such circumstances and it is desirable to provide a convenient search result in voice search.

An embodiment of the present disclosure provides a search apparatus or a program that causes a computer to function as the search apparatus, includes: a speech recognition unit that recognizes an input voice; a matching unit that matches a plurality of strings of search result target words, which are strings of words that are the objects of search result of a string of words corresponding to the input voice, with a speech recognition result, using a string of search result target pronunciation symbols, which is a line of pronunciation symbols representing pronunciations of the strings of search result target words, and a string of recognition result pronunciation symbols that is a line of pronunciation symbols representing the pronunciation of the speech recognition result of the input voice; a generation unit that generates a string of search result words, which is a search result of a string of words corresponding to the input voice from the plurality of strings of search result target words on the basis of the result of matching the string of search result target words with the speech recognition result; a selecting unit that selects emphasis target words that are the targets to be emphasized in the words of the string of search result words, on the basis of the matching result with the string of search result target words, which is the string of search result words, and a pronunciation symbol-to-word table in which the pronunciation symbols and the words are made to correspond to each other; and a conversion unit that converts the string of search result words into the string of emphasis words in which the emphasis target words are emphasized in the words of the string of search result words.

Another embodiment of the present disclosure provides a search method, in which a search apparatus searching a string of words corresponding to an input voice, includes: recognizing an input voice; matching that matches a plurality of strings of search result target words, which are strings of words that is the objects of search result of a string of words corresponding to the input voice, with a speech recognition result, by using a string of search result target words, which is a line of pronunciation symbols representing pronunciations of the strings of search result target words, and a string of recognition result pronunciation symbols that is a line of pronunciation symbols representing the pronunciation of the speech recognition result of the input voice; generating a string of search result words, which is a search result of a word corresponding to the input voice from the strings of search result target words on the basis of the result of matching the string of search result target words with the speech recognition result; selecting emphasis target words that are the targets to be emphasized in the words of the string of search result words, on the basis of the matching result with the string of search result target words, which is the string of search result words, and a pronunciation symbol-to-word table in which the pronunciation symbols and the words correspond to each other; and converting the string of search result words into the string of emphasis words in which the emphasis target words are emphasized in the words of the string of search result words.

Still another embodiment of the present disclosure provides a search apparatus including: a matching unit that matches a plurality of strings of search result target words, which are strings of words that are the targets of search result of a string of words corresponding to an input voice input to a client terminal, with a speech recognition result, using a string of search result target pronunciation symbols, which is a line of pronunciation symbols representing pronunciations of the strings of search result target words, and a string of recognition result pronunciation symbols that is a line of pronunciation symbols representing the pronunciation of the speech recognition result of the input voice; a generation unit that generates a string of search result words, which is a search result of a string of words corresponding to the input voice from the strings of search result target words on the basis of the result of matching the string of search result target words with the speech recognition result; a selecting unit that selects emphasis target words that are the targets to be emphasized in the words of the string of search result words, on the basis of the matching result with the string of search result target words, which is the string of search result words, and a pronunciation symbol-to-word table in which the pronunciation symbols and the words are made to correspond to each other; and a conversion unit that converts the string of search result words into the string of emphasis words in which the emphasis target words are emphasized in the words of the string of search result words.

According to an embodiment of the present disclosure, a plurality of strings of search result target words, which are strings of words that are the targets of search result of a string of words corresponding to an input voice, is matched with a speech recognition result, using a string of search result target words, which is a line of pronunciation symbols representing pronunciations of the strings of search result target words, and a string of recognition result pronunciation symbols that is a line of pronunciation symbols representing the pronunciation of the speech recognition result of the input voice and a string of search result words, which is a search result of a string of words corresponding to the input voice from the plurality of strings of search result target words is generated on the basis of the result of matching. Emphasis target words that are the targets to be emphasized in the words of the string of search result words are selected, on the basis of the matching result with the string of search result target words, which is the string of search result words, and a pronunciation symbol-to-word table in which the pronunciation symbols and the words are made to correspond to each other, and the string of search result words is converted into the string of emphasis words in which the emphasis target words are emphasized in the words of the string of search result words.

Further, the search apparatus may be an independent apparatus or an internal block constituting one apparatus.

Further, the program may be transmitted through a transmitting medium, or recorded on a recording medium.

Therefore according to the embodiments of the present disclosure, it is possible to provide a convenient search result.

BRIEF DESCRIPTION OF THE DRAWINGS

FIG. 7 is a showing the result of simulation of matching that uses a cosine distance D1, a first correction distance D1, and a second correction distance D2, as the degree of similarity between a speech recognition result and a string of search result target words.

FIG. 9 is a flowchart illustrating a process of a voice search apparatus.

FIG. 10 is a view showing an example of a pronunciation symbol-to-word table made by a table making unit.

FIG. 11 is a view illustrating a first making method in which the table making unit makes a pronunciation symbol-to-word table.

FIG. 12 is a flowchart illustrating a process of making the pronunciation symbol-to-word table in the first making method.

FIG. 13 is a view illustrating a second making method in which the table making unit makes a pronunciation symbol-to-word table.

FIG. 14 is a flowchart illustrating a process of making the pronunciation symbol-to-word table in the second making method.

FIG. 15 is a view showing another example of a pronunciation symbol-to-word table made by a table making unit.

FIG. 16 is a flowchart illustrating a process that is performed by a word selecting unit.

FIG. 17 is a view showing another example of a pronunciation symbol-to-word table.

FIG. 18 is a view showing a display example of a string of search result words.

FIG. 19 is a view showing a display example of a string of search result words.

FIG. 20 is a block diagram showing a configuration example of an embodiment of a computer where the present disclosure is applied.

DETAILED DESCRIPTION OF EMBODIMENTS

Embodiment of Recorder Using the Present Disclosure

Figure 1:
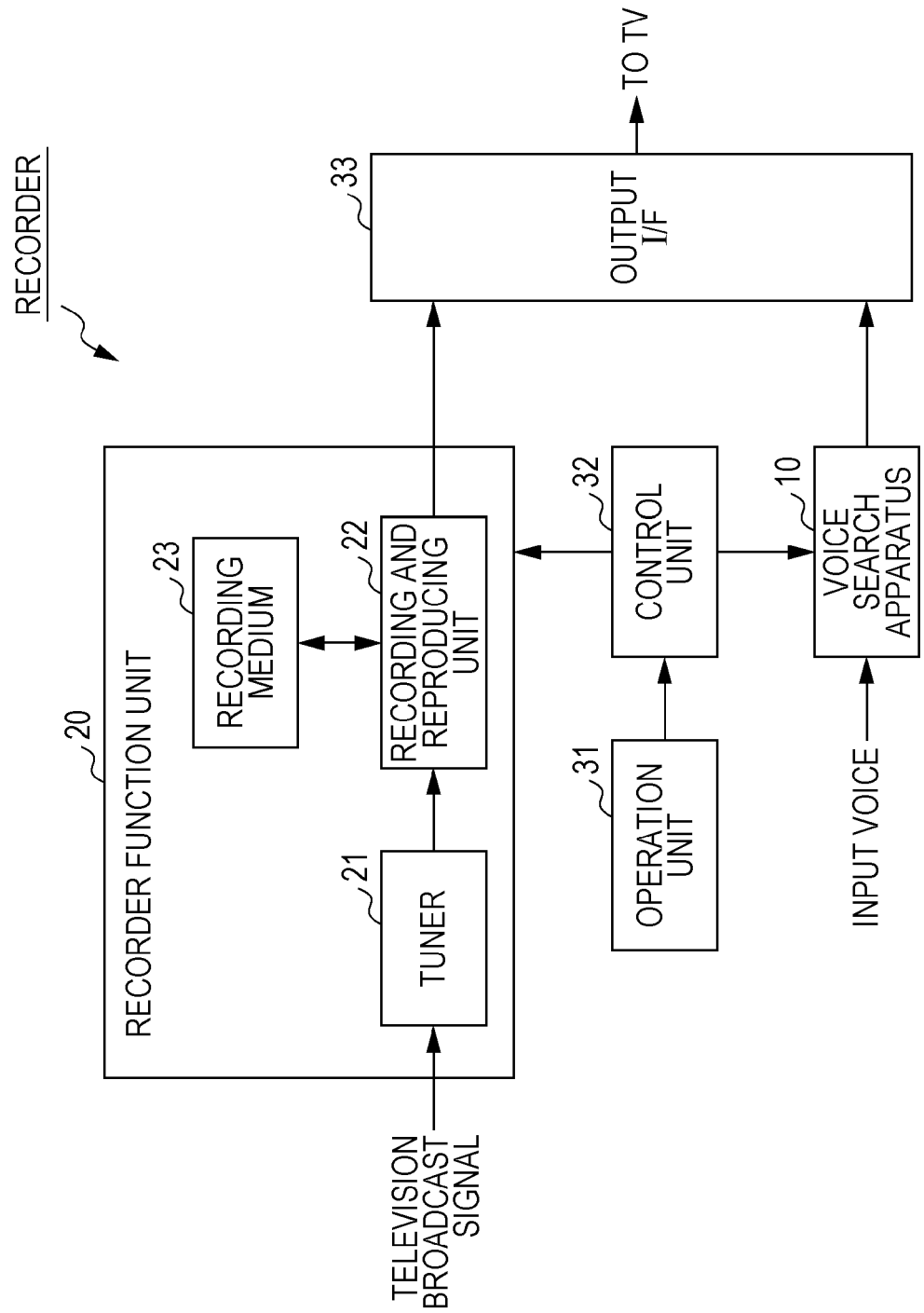
FIG. 1 is a block diagram showing a configuration example of an embodiment of a recorder where the present disclosure is applied.

FIG. 1 is a block diagram showing a configuration example of an embodiment of a recorder where a search apparatus of the present disclosure is applied.

In FIG. 1, a recorder includes a voice search apparatus 10, a recorder function unit 20, an operating unit 31, a control unit 32, and an output I/F (Interface) 33.

The voice search apparatus 10 is supplied with (data of) input voices uttered by a user through a microphone or the like, which is not shown in the figure.

The voice search apparatus 10 searches voices, for example, by voice search, using the input voices supplied thereto, and supplies a string of search result words acquired by the search result to the output I/F 33.

The recorder function unit 20 includes a tuner 21, a recording-reproducing unit 22, and a recording medium 23, and records (video-records) and reproduces television broadcasting programs.

That is, television program signals, for example, by digital broadcasting, which is received by an antenna (not shown), are supplied to the tuner 21.

The tuner 21 receives the supplied television broadcasting signals, extracts television broadcasting signals for predetermined channels from the television broadcasting signals, and demodulates bit streams, and supplies the signals to the recording-reproducing unit 22.

The recording-reproducing unit 22 extracts en EPG (Electronic Program Guide) or program data from the bit streams supplied from the tuner 21 and supplies them to the output I/F 33.

Further, the recording-reproducing unit 22 records (video-records) the EPG or the program data on the recording medium 23.

Further, the recording-reproducing unit 22 reproduces the program data from the recording medium 23 and supplies the program data to the output I/F 33.

The recording medium 23 is, for example, an HD (Hard Disk) or a semiconductor memory and the EPG or the program data is recorded on the recording medium 23 by the recording-reproducing unit 22.

The operating unit 31 is composed of buttons on a case body of a remote commander or a recorder and buttons displayed as a GUI (Graphics User Interface) on a display, which is not shown in the figure. The operating unit 31 is operated by a user and supplies operational signals corresponding to the operation to the control unit 32.

The control unit 32 controls the blocks constituting the recorder, such as the voice search apparatus 10 and the recorder function unit 20, and performs other processes, in response to the operational signals from the operating unit 31.

The EPG or the program data is supplied from the recording-reproducing unit 22 to the output I/F 33. Further, a string of search result words, that is the result of voice search for an input voice, is supplied from the voice search apparatus 10 to the output I/F 33.

The output I/F 33 is an interface connected with a display device that can display at least images, such as a TV (television receiver), supplies the EPG or the program data from the recording-reproducing unit 22, and the string of search result words from the voice search apparatus 10, for example, to a TV (not shown) connected to the output I/F 33 to be displayed.

[Example of Configuration of Voice Search Apparatus 10]

Figure 2:
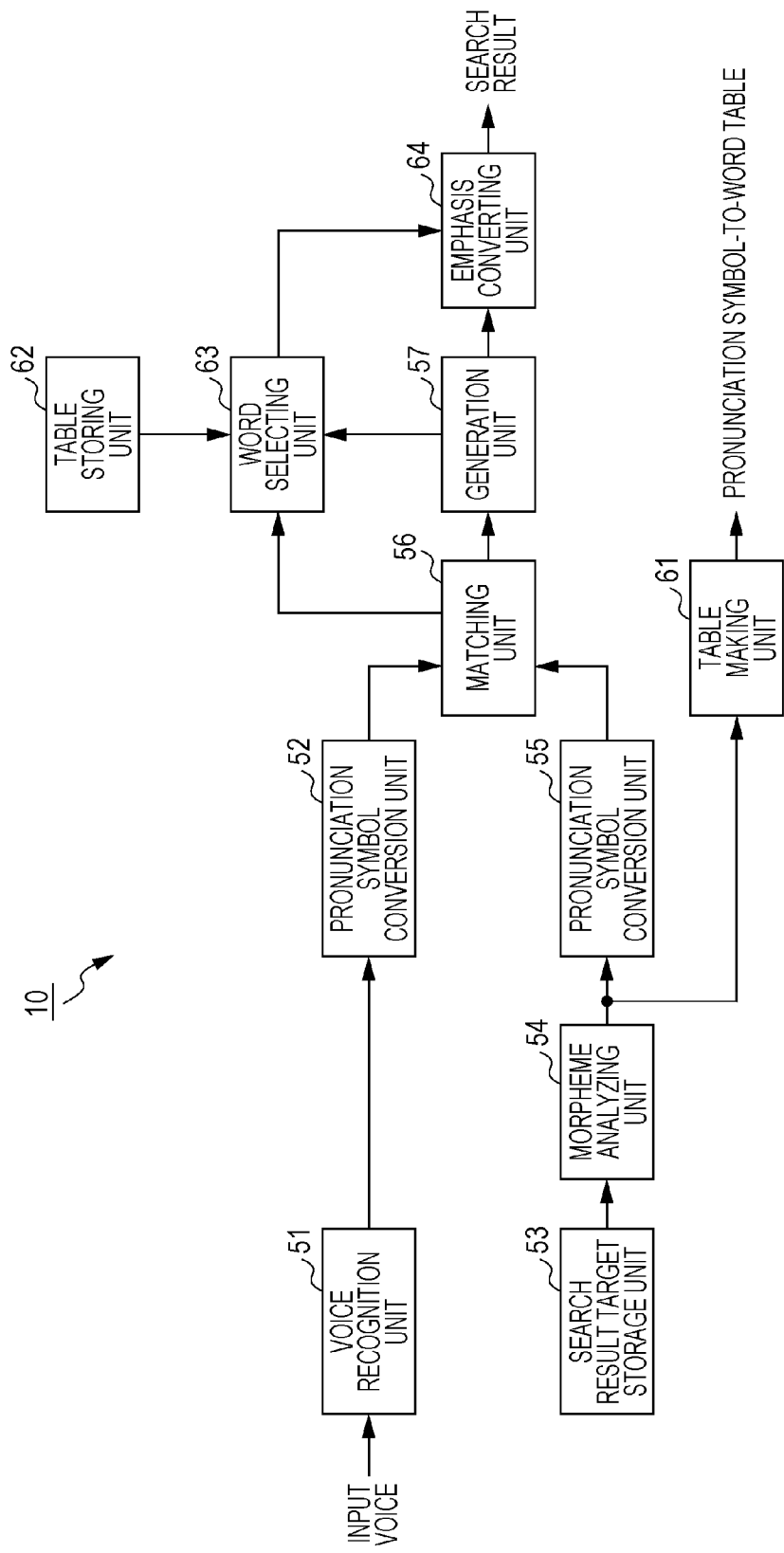
FIG. 2 is a block diagram showing the configuration of a voice search apparatus.

FIG. 2 is a block diagram showing the configuration of the voice search apparatus 10 of FIG. 1.

In FIG. 2, the voice search apparatus 10 includes a speech recognition unit 51, a pronunciation symbol conversion unit 52, a search result target storing unit 53, a morpheme analyzing unit 54, a pronunciation symbol conversion unit 55, a matching unit 56, a generation unit 57, a table making unit 61, a table storing unit 62, a word selecting unit 63, and a emphasis converting unit 64, and searches voices by voice search.

In voice search of the related art, matching a speech recognition result with a text of a string of search result target words is performed in a word unit or a notation symbol unit, using notation symbols that are symbols showing the notation of the speech recognition result and the string of search result target words.

Therefore, when the notation symbol of the speech recognition result is incorrect, in matching, a string of search result target words that is completely different from the string of words corresponding to the input voice is matched with the speech recognition result, such that the string of search result target words that is completely different from the string of words corresponding to the input voice is output as a string of search result words.

That is, when a user utters for example, "TO-SHI-NO-SE-KA-I ("TO-SHI-NO-SE-KA-I" has several meanings)" as an input voice and the notation symbol of the speech recognition result is, for example, "TOSHI NO SEKAI (city of world)", in matching for a word unit, the string of notation symbols for the speech recognition result "TOSHI NO SEKAI" is sectioned in a word unit, such as, "TOSHI/NO/SEKAI (world of cities)" (slash "/" shows a section) and the matching is performed, while in matching for unit notation symbol, the string of notation symbols for the speech recognition result "TOSHI NO SEKAI" is sectioned in a symbol unit, such as, "TO/SHI/NO/SE/KAI (world of cities)" and the matching is performed.

Meanwhile, when the string of notation symbols of the speech recognition result for the input voice "TO-SHI-NO-SE-KA-I" is for example "TOSHI NO SE KAI ("TOSHI NO SE" means "at the end of year," and "KAI" has no meaning)", in matching for a word unit, the string of notation symbols "TOSHI NO SE KAI" for the speech recognition result is sectioned in a word unit, such as "TOSHI/NO/SE/KAI ("TOSHI NO SE" means "at the end of year," and "KAI" has no meaning)" and the matching is performed, while in matching for a notation symbol unit, the string of notation symbols "TOSHI NO SE KAI" for the speech recognition result is sectioned in a notation symbol unit, such as "TOSHI/NO/SE/KAI" and the matching is performed.

Therefore, when the (string of notation symbols of) speech recognition results for the input voice "TO-SHI-NO-SE-KA-I" are "TOSHI NO SEKAI" and "TOSHI NO SE KAI", the strings of search result target words that are matched with the speech recognition result are considerably different, and as a result, strings of search result target words which is completely different from the string of words corresponding to the input voice are output as the strings of search result words while a string of words corresponding to the input voice is not output as a string of search result words.

As described above, the matching using the notation symbols is not considered as having high affinity with the speech recognition result and a string of words corresponding to the input voice is not acquired as a string of search result words.

In the voice search apparatus 10, matching the speech recognition result with the string of search result target words is performed using pronunciation symbols that are symbols representing the pronunciations of the speech recognition results and the string of search result target words, such that search of the string of words corresponding to the input voice can be robustly performed, and accordingly, the string of words corresponding to the input voice is prevented from not being output as a string of search result words.

That is, in the voice search apparatus 10 of FIG. 2, an (data of) input voice uttered from a user is supplied to the speech recognition unit 51 through a microphone, which is not shown.

The speech recognition unit 51 recognizes the supplied input voice and supplies the (notation symbol of) speech recognition result to the pronunciation symbol conversion unit 52.

The pronunciation symbol conversion unit 52 converts the (notation symbol of) speech recognition result for the input voice, which is supplied from the speech recognition unit 51, into a string of recognition result pronunciation symbols, which is a line of pronunciation symbols representing the pronunciation of the speech recognition result, and supplies the string of recognition result pronunciation symbols to the matching unit 56.

The search result target storing unit 53 stores a plurality of strings of search result target words, that is, a (text as notation symbols of) string of words that is the string of search result target words that can be the search result for the string of words corresponding to the input voice in the matching with the speech recognition result by the matching unit 56.

For example, program titles, performers' names, and the detailed information on the contents of the programs that are the components of the EPG stored on the recording medium 23 of the recorder of FIG. 1, are supplied and stored in the search result target storing unit 53.

Further, metadata of programs (video-recorded program) video-recorded (recorded) on the recording medium 23 of the recorder of FIG. 1, such as program titles, performers' names, and detailed information are supplied and stored in the search result target storing unit 53.

Therefore, in the embodiment, voice search is performed for the program tiles, performers' names, and detailed information, which are a string of search result target words, in the voice search apparatus 10.

The morpheme analyzing unit 54 divides a string of search result target words, for example, into a word (morpheme) unit by analyzing the morpheme of the string of search result target words stored in the search result target storing unit 53, and supplies the (notation) of the word constituting the string of search result target words or the phonemes (sound) of the words to the pronunciation symbol conversion unit 55 and the table making unit 61, as the result of morpheme analysis.

The pronunciation symbol conversion unit 55 converts the (notation symbol of) string of search result target words into a string of search result target pronunciation symbols that is a line of pronunciation symbols representing the pronunciations of the string of search result target words, using the result of morpheme analysis supplied from the speech recognition unit 54, and supplies the converted string to the matching unit 56 with the (notation symbol of) string of search result target words.

The matching unit 56 matches the speech recognition result with the string of search target words, using the string of recognition result pronunciation symbols for the speech recognition result from the pronunciation symbol conversion unit 52 and the string of search result target pronunciation symbols of the string of search target words from the pronunciation symbol conversion unit 55, and then supplies the matching result to the generation unit 57 and the word selecting unit 63.

That is, the matching unit 56 matches all of the strings of search result target words stored in the search result target storing unit 53 with the speech recognition result for the input voice, using the pronunciation symbols of the speech recognition result and the pronunciation symbols of the string of search result target words.

The matching unit 56 matches all of the strings of search result target words stored in the search result target storing unit 53 with the speech recognition result for the input voice, and then supplies the matching result to the generation unit 57 and the word selecting unit 63.

Meanwhile, the degree of similarity that represents the degree of similarity between the string of recognition result pronunciation symbols and the string of search result target pronunciation symbols is obtained in the matching with (the speech recognition result and the string of search result target words that use) the string of recognition result pronunciation symbols and the string of search result target pronunciation symbols.

A cosine distance of vector space method may be used for the degree of similarity.

In this configuration, the matching unit 56 takes, for example, one or more (continuous) pronunciation symbols, such as two pronunciation symbols, as the matching unit for matching, and matches the speech recognition result with the string of search result target words in the matching unit.

Further, the matching unit 56 outputs the degree of similarity between the string of recognition result pronunciation symbols and the string of search result target pronunciation symbols, and the match symbol that is the matching unit of the string of search result target pronunciation symbols, agreeing with the matching unit of the string of recognition result pronunciation symbols, as a matching result, together with the (notation symbols of) string of search result target words from the pronunciation symbol conversion unit 55.

In the matching result described above, the string of search result target words and the degree of similarity are supplied to the generation unit 57, while the string of search result target words and the match symbol are supplied to the word selecting unit 63.

The generation unit 57 generates a string of search result words that is the search result of the string of words corresponding to the input voice from the string of search result target words stored in the search result target storing unit 53, on the basis of the matching result from the matching unit 56.

That is, for example, the generation unit 57 selects the string of search result target words with high degree of similarity or the (notation symbols of) string of search result target words with a degree of similarity above a predetermined threshold, in the matching result for all of the strings of search result target words stored in the search result target storing unit 53 from the matching unit 56, as a string of search result words for the input voice.

Further, the generation unit 57 supplies the string of search result words to the word selecting unit 63 and the emphasis converting unit 64.

The table making unit 61 makes a pronunciation symbol-to-word table, which corresponds the pronunciation symbols to the words, by using the morpheme analysis result supplied from the morpheme analyzing unit 54, and supplies the table to the table storing unit 62.

That is, the table making unit 61 takes two or more continuous pronunciation symbols of the string of search result target words as a corresponding unit corresponding to the words in the string of search result target words stored in the search result target storing unit 53, and makes the pronunciation symbol-to-word table in which the corresponding unit corresponds to the word of the string of search result target words including at least a portion of the corresponding unit in the pronunciation symbols.

The table storing unit 62 stores the pronunciation symbol-to-word table supplied from the table making unit 61.

The word selecting unit 63 selects emphasis target words from the words in the string of search result words, on the basis of the matching result for the string of search result target words that is the string of search result words supplied from the generation unit 57 in the matching result supplied from the matching unit 56, and the pronunciation symbol-to-word table stored in the table storing unit 62.

A match symbol that is the pronunciation symbol agreeing with the matching unit of the string of recognition result pronunciation symbols in the pronunciation symbols of the string of search result words is included in the matching result for the string of search result target words that is the string of search result word.

Meanwhile, the corresponding units that are two or more continuous pronunciation symbols of the string of search result target words and the words constituting the string of search result target words are made to correspond to each other in sets in the pronunciation symbol-to-word tables.

The word selecting unit 63 detects a word set including the corresponding unit included in the match symbol of the string of search result words from the sets of corresponding units and a word (hereafter, referred to as a word set), in the string of search result words (string of search result target words) which is registered in the pronunciation symbol-to-word table, and selects the word included in the word set as an emphasis target word.

Meanwhile, the emphasis target word, which is selected from (a string of search result target word) which corresponds to a string of search result words is a word included in the string of search result words.

The word selecting unit 63 supplies the emphasis target word selected in the string of search result words to the emphasis converting unit 64.

The emphasis converting unit 64 converts the string of search result words from the generation unit 57 into a string of emphasis words in which the emphasis target word from the word selecting unit 63 is emphasized, in the words of the string of search result words, and supplies the string of emphasis words to the output I/F 33 (FIG. 1).

That is, when (a word agreeing with) the emphasis target word supplied from the word selecting unit 63 is included in the string of search result words from the generation unit 57, the emphasis converting unit 64 converts the string of search result words from the generation unit 57 into a string of emphasis words in which the emphasis target word is emphasized, by changing the (data of) display attributes, such as the font or display color, of the emphasis target word in the string of search result words from the generation unit 57 to different display attributes from those for the display of the other words.

In the voice search apparatus 10 having the configuration described above, a process of searching a voice by voice search is performed in response to the user's utterance.

That is, the morpheme analyzing unit 54 analyzes the morphemes all of the strings of search result target words stored in the search result target storing unit 53, and supplies the result of analyzing morpheme to the pronunciation symbol conversion unit 55 and the table making unit 61.

The pronunciation symbol conversion unit 55 converts all the strings of search result target words stored in the search result target storing unit 53 into a string of search result target pronunciation symbols, on the basis of the result of morpheme analysis from the morpheme analyzing unit 54, and supplies the converted result to the matching unit 56 together with the string of search result target words.

Further, the table making unit 61 makes the pronunciation symbol-to-word table in which the corresponding units that are two or more continuous pronunciation symbols of the string of search result target words and the words constituting the string of search result target words are made to correspond to each other and registered a word sets, for all of the strings of search result target words stored in the search result target storing unit 53, by using the morpheme analysis result supplied from the morpheme analyzing unit 54, and then supplies and stores the table in the table storing unit 62.

Subsequently, as the user utters and an input voice is supplied to the speech recognition unit 51 by the utterance, the speech recognition unit 51 recognizes the input voice and supplies the speech recognition result for the input voice to the pronunciation symbol conversion unit 52.

The pronunciation symbol conversion unit 52 converts the speech recognition result for the input voice from the speech recognition unit 51 into a string of recognition result pronunciation symbols and supplied the converted result to the matching unit 56.

The matching unit 56 matches all of the strings of search result target words stored in the search result target storing unit 53 with the speech recognition result for the input voice, by using the string of recognition result pronunciation symbols from the pronunciation symbol conversion unit 52 and the string of search result target pronunciation symbols from the pronunciation symbol conversion unit 55, and supplied the matching result to the generation unit 57 and the word selecting unit 63.

The generation unit 57 selects (string of search result target words which corresponds to) a string of search result words that is the search result of the string of words corresponding to the input voice from the string of search result target words stored in the search result target storing unit 53, on the basis of the matching result from the matching unit 56, and supplies the selected result to the word selecting unit 63 and the emphasis converting unit 64.

The word selecting unit 63 selects words to emphasize from the words in the string of search result words, on the basis of the matching result for the string of search result target words that is the string of search result words supplied from the generation unit 57 in the matching result supplied from the matching unit 56, and the pronunciation symbol-to-word table stored in the table storing unit 62, and supplies the selected result to the emphasis converting unit 64.

The emphasis converting unit 64 converts the string of search result words from the generation unit 57 into a string of emphasis words in which the emphasis target words from the word selecting unit 63 are emphasized, and outputs the converted result (to the output I/F 33).

In the recorder of FIG. 1, which is equipped with the voice search apparatus 10 described above, for example, it is possible to search and reproduce a program that the user wants from programs video-recorded (video-recorded program), by using voice search.

That is, when the user utters an input voice, for example, "SEKAI ISAN (world heritage)", as a keyword for performing voice search for the program to reproduce, in the voice search apparatus 10, voice search is performed for the titles of the video-recorded programs, which are stored as a string of search result target words in the search result target storing unit 53, the titles of a predetermined number of programs of which the pronunciations are similar to the input voice "SEKAI ISAN" are generated as a string of search result words, and converted into a string of emphasis words, and then supplied to the output I/F 33.

Further, the output I/F 33 displays the titles of the programs in the string of emphasis words (string of search result words converted into the string of emphasis words), (on a TV (television receiver) or the like connected with the recorder) as expected programs for reproduction (expected reproduction programs).

In this process, the emphasis target words in the string of emphasis words that are the program titles are emphasized and displayed.

Subsequently, when the user selects one program as a program to reproduce, from expected reproduction programs, by operating the operation unit 31, the program is reproduced in the recorder function unit 20.

Meanwhile, in FIG. 2, although two pronunciation symbol conversion units 52 and 55 are provided, the two pronunciation symbol conversion units 52 and 55 may be replaced with one pronunciation symbol conversion unit.

Further, in FIG. 2, although the (text as notation symbol of) string of search result target words is stored in the search result target storing unit 53, the string of search result target words, the string of search result target pronunciation symbols achieved by converting the string of search result target words into pronunciation symbols can be stored in the search result target storing unit 53.

Further, in FIG. 2, in the speech recognition unit 51, although a voice input is recognized and the (notation symbols of) speech recognition result is output, the string of recognition result pronunciation symbols achieved by converting the speech recognition result into pronunciation symbols can be output in the speech recognition unit 51.

In this case, the voice search apparatus 10 can be implemented without the pronunciation symbol conversion unit 52.

[Matching by Matching Unit 56]

Matching by the matching unit 56 of FIG. 2 will be described with reference to FIG. 3 to FIG. 8.

Figure 3:
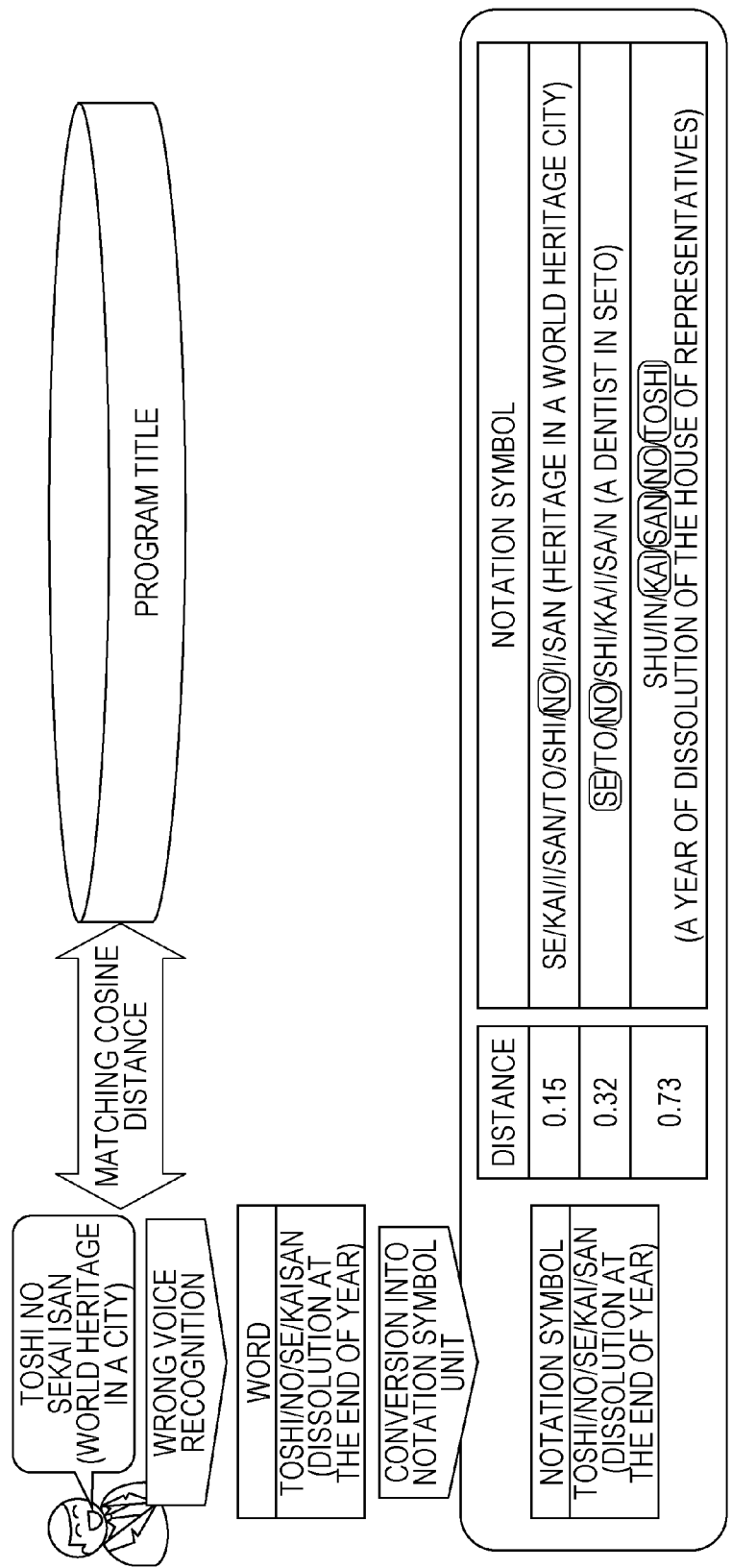
FIG. 3 is a view illustrating that it is disadvantageous for voice search performance that different matching results are acquired for speech recognition result with different notations in matching that uses notation symbols.

FIG. 3 is a view illustrating matching of the speech recognition result with a text as a string of search result target words performed using the notation symbols that are symbols representing notations for the speech recognition result and the string of search result target words.

The notation (symbol) does not match with the pronunciation in some cases.

In detail, for example, the pronunciation (sound) of Hiragana "HA" may be "HA" and "WA", but the difference in pronunciation is not represented by the notation symbol.

Further, for Chinese characters with a plurality of sounds, for example, a Chinese character meaning "a place where many people gather", it is not possible to represent whether its sound is "SHI (city)" or "ICHI (market)", by using the notation symbols.

Meanwhile, for example, strings of words "TOSHI NO SEKAI ISAN (world heritage in a city)" and "TOSHI NO SE KAISAN (dissolution of Diet at the end of year)", which are represented by notation symbols, are substantially the same in pronunciation, but the parts other than "NO" are different in notation symbol.

Therefore, when the speech recognition result is "TOSHI NO SEKAI ISAN" and, "TOSHI NO SE KAISAN", although it is possible to acquire different matching results in matching with notation symbols, this is not necessarily advantageous in performance of voice search.

That is, FIG. 3 is a view illustrating that it is disadvantageous for the voice search performance that different matching results are acquired for speech recognition result with (substantially) the same pronunciation but (substantially) different notations in matching that uses notation symbols.

In FIG. 3, when a voice input "TOSHI NO SEKAI ISAN" is recognized, the pronunciation is (substantially) the same as the input voice "TOSHI NO SEKAI ISAN", but an incorrect recognition result "TOSHI NO SE KAISAN" with different notation is acquired.

Further, in FIG. 3, the speech recognition result "TOSHI NO SE KAISAN" is sectioned in a notation symbol unit (slash "/" shows a section) and matching is performed in the notation symbol unit, such as, "TOSHI/NO/SE/KAISAN".

Further, in FIG. 3, as a string of search result target words that will be matched, for example, as the program title, three of "SEKAI ISAN TOSHI NO ISAN (heritage in a world heritage city)", "SETO NO SHIKAI SAN (a dentist in Seto, "Seto" is a name of a place in Japan)", and "SHUIN KAISAN NO TOSHI (a year in which dissolution of the house of representatives occurs)" are prepared.

For the speech recognition result "TOSHI NO SE KAISAN" and the string of search result target words "SEKAI ISAN TOSHI NO ISAN", only one notation symbol "NO" which is circled in the figure is the same in the notation symbol unit in the figure.

Further, for the speech recognition result "TOSHI NO SE KAISAN" and the string of search result target words "SETO NO SHIKAI SAN", two notation symbols "SE" and "NO" which are circled in the figure are the same in the notation symbol unit.

Further, for the speech recognition result "TOSHI NO SE KAISAN" and the string of search result target words "SHUIN KAISAN NO TOSHI", four notation symbols "KAI", "SAN", "NO", and "TOSHI" which are circled in the figure are the same in the notation symbol unit.

Therefore, for the degree of similarity between the speech recognition result and the string of search result target words, which is obtained in matching in the notation symbol unit, the degree of similarity between the speech recognition result "TOSHI NO SE KAISAN" and the string of search result target words "SHUIN KAISAN NO TOSHI" is the highest.

That is, as the degree of similarity obtained in matching, for example, a cosine distance is used.

Further, as a vector representing a string of words, for example, the vector in which the component corresponding to the notation symbols in a string of words is 1 while a vector when the component corresponding to notation symbols not in the string of words is 0 is selected, and the cosine distance as the degree of similarity of the two strings of words is acquired using the vectors representing the two strings of words.

In this case, in matching in the notation symbol unit, a degree of similarity of 0.15 is acquired between the speech recognition result "TOSHI NO SE KAISAN" and the string of search result target words "SEKAI ISAN TOSHI NO ISAN", a degree of similarity of 0.32 is acquired between the speech recognition result "TOSHI NO SE KAISAN" and the string of search result target words "SETO NO SHIKAI SAN", and a degree of similarity of 0.73 is acquired between the speech recognition result "TOSHI NO SE KAISAN" and the string of search result target words "SHUIN KAISAN NO TOSHI".

Therefore, for example, when the string of search result target words with the highest degree of similarity acquired by matching is the string of search result words, and an incorrect speech recognition result "TOSHI NO SE KAISAN" is acquired for the input voice "TOSHI NO SEKAI ISAN (world heritage in a city)", the "SHUIN KAISAN NO TOSHI" is considered as the string of search result words in the three program titles "SEKAI ISAN TOSHI NO ISAN", "SETO NO SHIKAI SAN", and "SHUIN KAISAN NO TOSHI".

For the input voice "TOSHI NO SEKAI ISAN", it is appropriate that the first program title "SEKAI ISAN TOSHI NO ISAN" is considered as the string of search result words, in the three program titles of "SEKAI ISAN TOSHI NO ISAN", "SETO NO SHIKAI SAN", and "SHUIN KAISAN NO TOSHI".

However, when the input voice "TOSHI NO SEKAI ISAN" is recognized as "TOSHI NO SE KAISAN", which is the same in pronunciation but different in notation, not an appropriate program title "SEKAI ISAN TOSHI NO ISAN", but a program title "SHUIN KAISAN NO TOSHI" that is completely different from "TOSHI NO SEKAI ISAN" is considered as the string of search result words, for the input voice "TOSHI NO SEKAI ISAN".

Further, when "TOSHI NO SEKAI ISAN" that is the same in notation is acquired as the speech recognition result for the input voice "TOSHI NO SEKAI ISAN", an appropriate program title "SEKAI ISAN TOSHI NO ISAN" with the highest degree of similarity is considered as the string of search result words, for the input voice "TOSHI NO SEKAI ISAN".

As described above, the matching results (the degree of similarity between the speech recognition result and the string of search result target words) in matching using the notation symbols are different when the speech recognition result as "TOSHI NO SEKAI ISAN" and "TOSHI NO SE KAISAN", such that, for the input voice "TOSHI NO SEKAI ISAN", an appropriate program title "SEKAI ISAN TOSHI NO ISAN" is considered as the string of search result words, or the appropriate program title is not considered as the string of search result words, but the program title "SHUIN KAISAN NO TOSHI" that does not relate to the input voice "TOSHI NO SEKAI ISAN" at all may be considered as the string of search result words.

The matching unit 56 of the voice search apparatus (FIG. 2) performs matching using the pronunciation symbols in order to prevent an appropriate program title from not being output as a string of search result words for an input voice.

The pronunciation symbols are symbols representing the pronunciations of syllables or phonemes, for example and for Japanese, Hiragana representing sound can be used. Further, syllables are used as the pronunciation symbols herein.

In matching using the pronunciation symbols, (one) syllable, two or more-syllable concatenation, (one) phoneme, or two or more-phoneme concatenation can be used for the unit of matching (matching unit).

Further, the matching result and the performance of voice search depend on which matching unit is used in matching using the pronunciation symbols.

Figure 4:
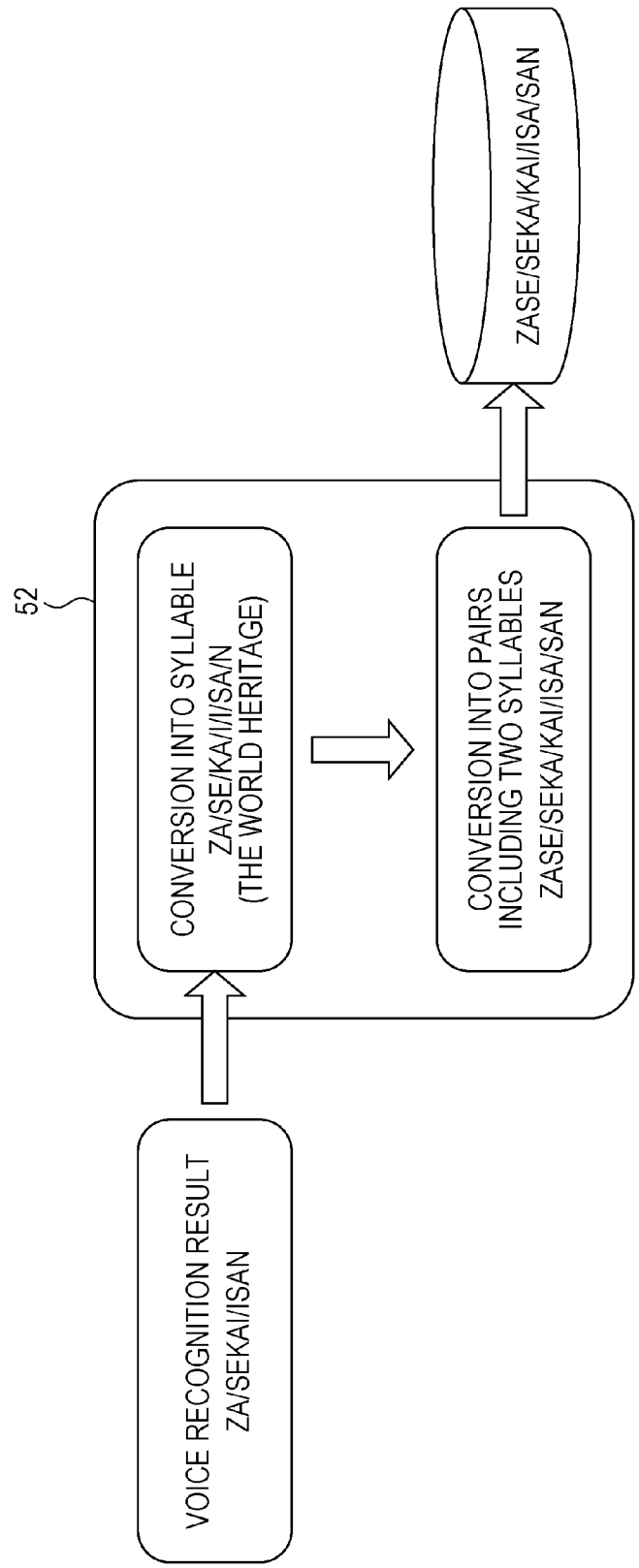
FIG. 4 is a view illustrating a process of a pronunciation symbol conversion unit when two-syllable concatenation is used as a matching unit.

FIG. 4 is a view illustrating the process of the pronunciation symbol conversion unit 52 of FIG. 2 when two-syllable concatenation (two continuous syllables (pronunciation symbols)) is used as the matching unit in the matching unit 56 (FIG. 2).

The (notation symbols of) speech recognition result for an input voice is supplied to the pronunciation symbol conversion unit 52 from the speech recognition unit 51.

The pronunciation symbol conversion unit 52 converts the speech recognition result supplied from the speech recognition unit 51 into a line of syllables that are pronunciation symbols.

Further, the pronunciation symbol conversion unit 52 extracts two-syllable concatenation composed of two continuous syllables, that is, a noticed syllable and the next syllable right after the noticed syllable while moving back by one syllable from the noticed syllable at the head of the line of speech recognition result syllables, and then supplies the lines of two-syllable concatenations to the matching unit 56 (FIG. 2).

Both the line of syllables of a speech recognition result and the line of two-syllable concatenations are strings of recognition result pronunciation symbols that are lines of pronunciation symbols of the speech recognition result, but particularly, the line of two-syllable concatenations is referred to as a string of recognition result two-syllable concatenation symbols.

Figure 5:
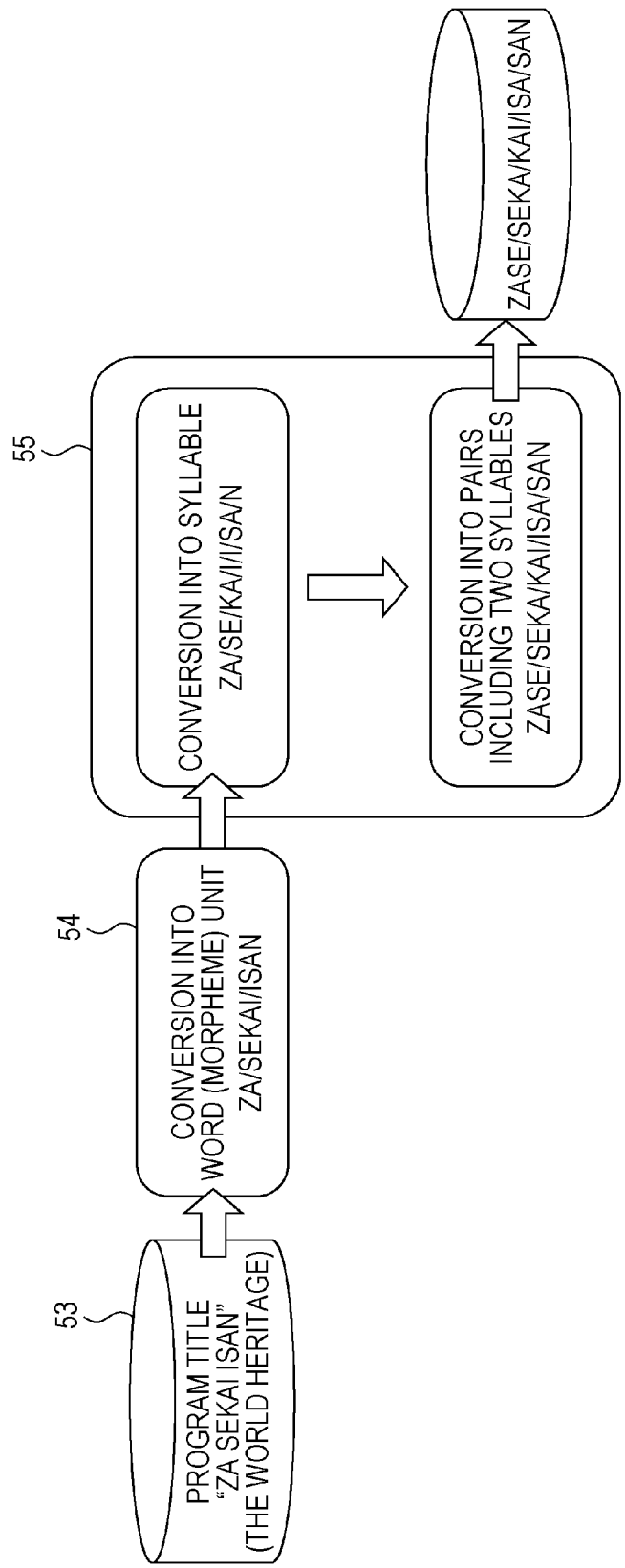
FIG. 5 is a view illustrating a process of a pronunciation symbol conversion unit when two-syllable concatenation is used as a matching unit.

FIG. 5 is a view illustrating the process of the pronunciation symbol conversion unit 55 of FIG. 2, when two-syllable concatenation is used as the matching unit in the matching unit 56 (FIG. 2).

The program tiles that are the strings of search result target words stored in the search result target storing unit 53 of which the morphemes are analyzed by the morpheme analyzing unit 54 are supplied to the pronunciation symbol conversion unit 55.

The pronunciation symbol conversion unit 55 converts the string of search result target words supplied from the morpheme analyzing unit 54 into a line of syllables.

Further, the pronunciation symbol conversion unit 55 extracts two-syllable concatenation composed of two continuous syllables, that is, a noticed syllable and the next syllable right after the noticed syllable while moving back by one syllable from the noticed syllable at the head of the line of syllables of the string of search result target words, and then supplies the lines of two-syllable concatenations to the matching unit 56 (FIG. 2).

Both the line of syllables of the string of search result target words and the line of two-syllable concatenations are strings of search result target pronunciation symbols that are lines of pronunciation symbols of string of search result target words, but particularly, the line of two-syllable concatenations is referred to as a string of search result target two-symbol concatenations.

For the matching unit 56, for example, when the cosine distance is obtained matching in units of the two-syllable concatenation between the string of recognition result pronunciation symbols and the string of search result target pronunciation symbols, and for the degree of similarity between the string of recognition result two-symbol concatenations and the string of search result target two-symbol concatenations, a recognition result vector that is a vector representing the string of recognition result two-symbol concatenations is necessary.

That is, the matching unit 56 obtains a vector, for example, in which the component corresponding to the two-syllable concatenation in the string of recognition result two-symbol concatenations is 1 and the component corresponding to the two-syllable concatenation not in the string of recognition result two-symbol concatenations is 0, as a recognition result vector representing a string two-recognition result symbols.

Further, the matching unit 56 obtains a search result target vector that is the vector representing the string of search result target two-symbol concatenations of the string of search result target words, for the program titles that is the string of search result target words stored in the search result target storing unit 53.

Further, the matching unit 56 performs matching that has a matching unit of two-syllable concatenation as a matching unit and necessitates the cosine distance, is obtained by dividing the scalar product between the recognition result vector and the search result target vector by the multiplication of the magnitude of the recognition result vector and the magnitude of the search result target vector, as the degree of similarity (of pronunciation symbols) between the speech recognition result and the string of search result target words.

Figure 6:
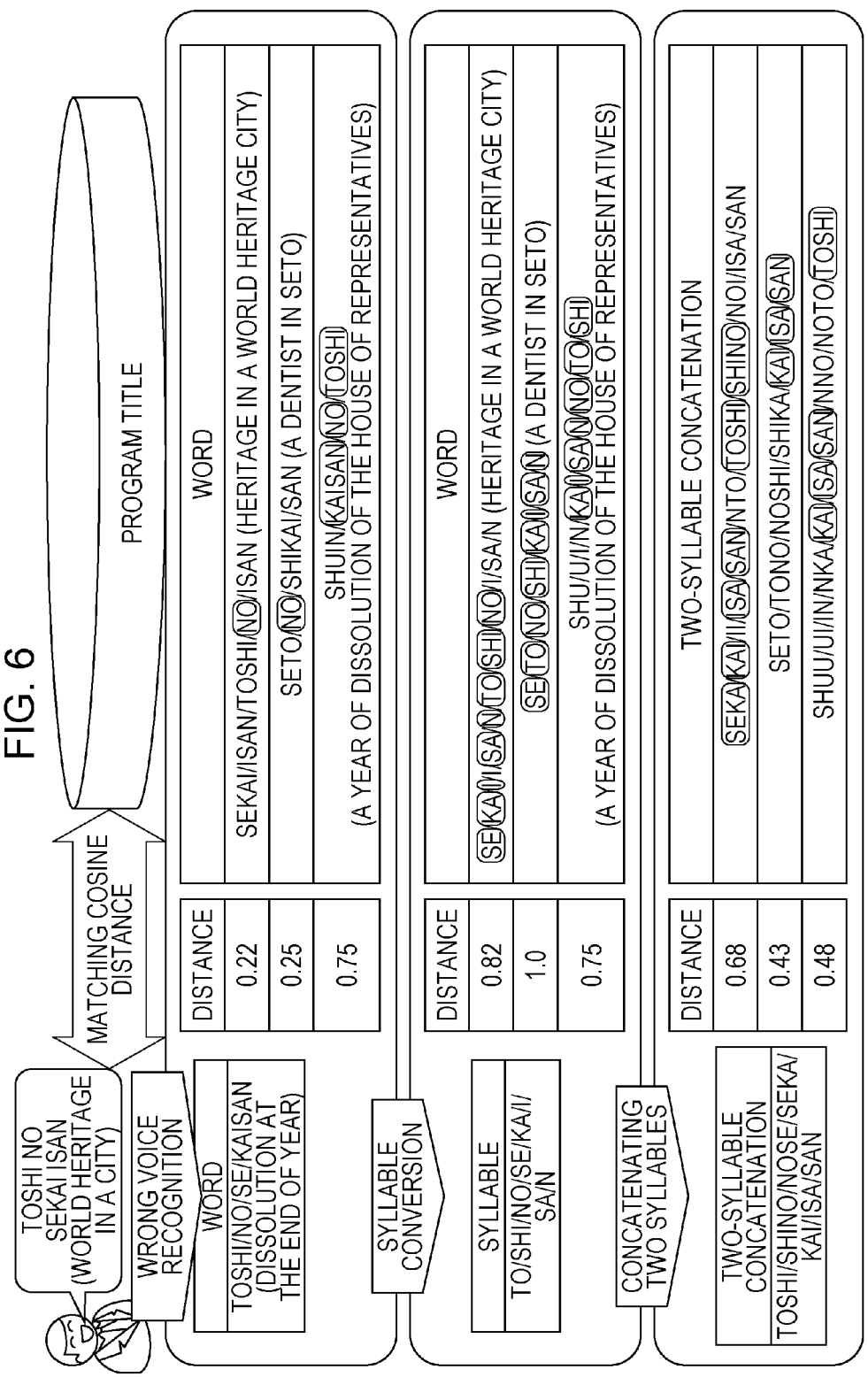
FIG. 6 is a view showing the results of matching in a word unit, matching in a syllable unit, and matching in a two-syllable concatenation.

FIG. 6 is a view showing the results of matching in a word unit, matching in (one) syllable unit, and matching in a two-syllable concatenation.

Further, in FIG. 6, similar to FIG. 3, an incorrect speech recognition result "TOSHI NO SE KAISAN (dissolution of Diet at the end of year)" is acquired for an input voice "TOSHI NO SEKAI ISAN (world heritage in a city)", and for example three of "SEKAI ISAN TOSHI NO ISAN (heritage in a world heritage city)", "SETO NO SHIKAI SAN (a dentist in Seto, "Seto" is a name of a place in Japan)", and "SHUIN KAISAN NO TOSHI (a year in which dissolution of the house of representatives occurs)" are prepared as the string of search result target words, for example, program titles.

Further, in FIG. 6, matching using notation symbols in the word unit, matching using the pronunciation symbols in the syllable unit, and matching using the pronunciation symbols in the two-syllable concatenation unit are performed.

Further, in FIG. 6, the words or the pronunciation symbols in the string of search result target words, which agree with the words or the pronunciation symbols (syllables) in the speech recognition result "TOSHI NO SE KAISAN", are circled.

In the matching in the word unit, 0.22, 0.25, and 0.75 obtains the degree of similarities (cosine distances) between the speech recognition result "TOSHI NO SE KAISAN" and the "SEKAI ISAN TOSHI NO ISAN", "SETO NO SHIKAI SAN", and "SHUIN KAISAN NO TOSHI", respectively.

Therefore, for example, when the string of search result target words with the highest degree of similarity acquired in matching is output as the string of search result words, an incorrect speech recognition result "TOSHI NO SE KAISAN" is acquired for the input voice "TOSHI NO SEKAI ISAN", in matching using the notation symbols in the word unit, the "SHUIN KAISAN NO TOSHI" that is the string of search result target words, which has the highest degree of similarity of 0.75 with the speech recognition result "TOSHI NO SE KAISAN", is considered as the string of search result words, in the three program titles "SEKAI ISAN TOSHI NO ISAN", "SETO NO SHIKAI SAN", and "SHUIN KAISAN NO TOSHI" as the string of search result words.

For the input voice "TOSHI NO SEKAI ISAN", it is appropriate that the first program title "SEKAI ISAN TOSHI NO ISAN" is considered as the string of search result words, in the three program titles of "SEKAI ISAN TOSHI NO ISAN", "SETO NO SHIKAI SAN", and "SHUIN KAISAN NO TOSHI".

However, when the input voice "TOSHI NO SEKAI ISAN" is recognized as "TOSHI NO SE KAISAN", which is the same in pronunciation but different in notation, in the matching using the notation symbols in the word unit, not an appropriate program title "SEKAI ISAN TOSHI NO ISAN", but a program title "SHUIN KAISAN NO TOSHI" that is completely different from "TOSHI NO SEKAI ISAN" is considered as the string of search result words, for the input voice "TOSHI NO SEKAI ISAN".

Further, even when the matching unit the notation symbols is performed not in the word unit but in the notation symbol unit, as described with reference to FIG. 3, the program title "SHUIN KAISAN NO TOSHI", which does not relate to a input voice "TOSHI NO SEKAI ISAN" at all, is considered as the string of search result words for the incorrect speech recognition result "TOSHI NO SE KAISAN" for the voice input "TOSHI NO SEKAI ISAN".

In the matching using the pronunciation symbols in the syllable unit, 0.82, 1.0, and 0.75 are obtained for the degree of similarity between the speech recognition result "TOSHI NO SE KAISAN" and the "SEKAI ISAN TOSHI NO ISAN", "SETO NO SHIKAI SAN", and "SHUIN KAISAN NO TOSHI", respectively.

Therefore, for example, when the string of search result target words with the highest degree of similarity acquired in matching is output as the string of search result words, and an incorrect speech recognition result "TOSHI NO SE KAISAN" is acquired for the input voice "TOSHI NO SEKAI ISAN", in matching using the pronunciation symbols in the syllable unit, the "SETO NO SHIKAI SAN" that is the string of search result target words, which has the highest degree of similarity of 1.0 with the speech recognition result "TOSHI NO SE KAISAN", is considered as the string of search result words, in the three program titles "SEKAI ISAN TOSHI NO ISAN", "SETO NO SHIKAI SAN", and "SHUIN KAISAN NO TOSHI".

That is, when the input voice "TOSHI NO SEKAI ISAN" is recognized as "TOSHI NO SE KAISAN", which is the same in pronunciation but different in notation, in the matching using the pronunciation symbols in the syllable unit, not an appropriate program title "SEKAI ISAN TOSHI NO ISAN", but a program title "SETO NO SHIKAI SAN" that is different at all from "TOSHI NO SEKAI ISAN" is considered as the string of search result words, for the input voice "TOSHI NO SEKAI ISAN".

Further, in the matching using the notation symbols in the word unit, the degree of similarity of an appropriate program tile "TOSHI NO SEKAI ISAN TOSHI NO ISAN (heritage of world heritage city of city" for the input voice "TOSHI NO SEKAI ISAN" is 0.22, which is the third (the lowest) in the three strings of search result target words, while in the matching using the pronunciation symbols in the syllable unit, the degree of similarity of an appropriate program tile "TOSHI NO SEKAI ISAN TOSHI NO ISAN" for the input voice "TOSHI NO SEKAI ISAN" is 0.82 that is the second value in the three strings of search result target words.

Therefore, the matching using the pronunciation symbols in the syllable unit can be considered as being more advantageous than the matching using the notation symbols in the word unit, because the degree of similarity of the appropriate program title "SEKAI ISAN TOSHI NO ISAN" for the input voice "TOSHI NO SEKAI ISAN" is higher than that in the matching in the word unit.

In the matching using the pronunciation symbols in the two-syllable concatenation unit, 0.68, 0.43, and 0.48 are obtained for the degrees of similarity between the speech recognition result "TOSHI NO SE KAISAN" and the "SEKAI ISAN TOSHI NO ISAN", "SETO NO SHIKAI SAN" and "SHUIN KAISAN NO TOSHI", respectively.

Therefore, for example, even when the string of search result target words with the highest degree of similarity acquired in matching is output as the string of search result words, an incorrect speech recognition result "TOSHI NO SE KAISAN" is acquired for the input voice "TOSHI NO SEKAI ISAN", in matching using the pronunciation symbols in the two-syllable concatenation unit, the "SEKAI TOSHI NO ISAN (heritage of word city)" that is the string of search result target words, which has the highest degree of similarity of 0.68 with the speech recognition result "TOSHI NO SE KAISAN", that is, the appropriate title "SEKAI ISAN TOSHI NO ISAN" for the input voice "TOSHI NO SEKAI ISAN" is considered as the string of search result words, in the three program titles "SEKAI ISAN TOSHI NO ISAN", "SETO NO SHIKAI SAN", and "SHUIN KAISAN NO TOSHI" as the strings of search result target words.

As described above, according to the matching unit the pronunciation symbols, even for the string of search result target words of which the notation is completely different from the speech recognition result, if the pronunciation is similar to the speech recognition result, the degree of similarity is high, such that search of a string of words corresponding to the input voice can be robustly performed, as compared with when the matching using the notation symbols is performed.

As a result, according to the matching using the pronunciation symbols, even if speech recognition is incorrect, it is possible to prevent (reduce) the string of words corresponding to the input voice from not being output as the string of search result words.

However, in the matching unit 56 (FIG. 1), when the cosine distance is selected as the degree of similarity between the (string of recognition result pronunciation symbols) voice input result and the (string of search result target pronunciation symbols) string of search result target words, for example, as described above, the vector in which the component corresponding to the syllable (two-syllable concatenation) in the string of recognition result pronunciation symbols is 1 and the component corresponding to the syllable not in the string of recognition result pronunciation symbol is 0, is necessary for a recognition result vector representing the string of recognition result pronunciation symbols.

Further, in the matching unit 56, similarly, a search result target vector representing the string of search result target pronunciation symbols of the string of search result target words is necessary.

In the embodiment, although the value of the component of the recognition result vector becomes 1 or 0, depending on whether the syllable corresponding to the component is in the string of recognition result pronunciation symbols or not, a tf (Term Frequency) that is the frequency at which the syllable corresponding to the component appears in the string of recognition result pronunciation symbols may be selected as the value of the component of the recognition result vector.

Further, for example, an invert document frequency (IDF) at which the syllable that disproportionately appears in the string of search result target words is large while the syllable that proportionately appears in many strings of search result target word is small, or a TF-IDF composed of both the ft and IDF may be selected as the value of the component of the recognition result vector.

It is the same for the search result target vector.

Assuming that the recognition result vector is VUTR and the search result target vector of the i-th string of search result target words stored in the search result target storing unit 53 (FIG. 1) is VTITLE(i), the cosine distance D that is the degree of similarity between the speech recognition result and the i-th string of search result target word is calculated from Formula (1).

$$D = VUTR \cdot VTITLE(i)/(|VUTR||VTITLE(i)|) \qquad (1)$$

In Formula (1), · shows scalar product and |x| shows the magnitude (norm) of a vector x. Therefore, the cosine distance D is obtained by dividing the scalar product VUTR·VTITLE(i) of the recognition result vector VUTR and the search result target vector VTITLE(i) by the multiplication |VUTR||VTITLE(i)| of the magnitude |VUTR| of the recognition search result VUTR and the magnitude |VTITLE (i)| of the search result target vector VTITLE(i).

The cosine distance D is in the range of 0.0 to 1.0, and the larger the distance, the more the string of recognition result pronunciation symbols represented by the result vector VUTR and the string of search result target pronunciation symbols represented by the search result target vector VTITLE(i) become similar.

As described above, the cosine distance D is obtained by dividing the scalar product VUTR·VTITLE(i) of the recognition result vector VUTR and the search result target vector VTITLE(i) by the multiplication of the magnitude |VUTR| of the recognition search result VUTR and the magnitude |VTITLE(i)| of the search result target vector VTITLE(i), such that the cosine distance D is typically influenced by the difference in length of the speech recognition result and the string of search result target words.

The length of the speech recognition result and the string of search result target words is a value corresponding to the number of notation symbols of the speech recognition result and the string of search result target words, when the speech recognition result and the string of search result target words are matched, that is, the cosine distance D, which is the degree of similarity, is calculated by using the notation symbols in the notation symbol unit, and for example, the square root of the sum of the number of notation symbols.

Further, when the degree of similarity is calculated by using the notation symbols in the word unit, the length of the speech recognition result and the string of search result target words is a value corresponding to the speech recognition result and the number of search result target words, for example, the square root of the sum of the number of words.

Further, when the degree of similarity is calculated by using the pronunciation symbols in the pronunciation unit, the length of the speech recognition result and the string of search result target words is a value corresponding to the speech recognition result and the number of syllables of the pronunciation symbols of the string of search result target words, for example, the square root of the sum of the number of syllables.

Further, when the degree of similarity is calculated by using the pronunciation symbols in the two-syllable concatenation unit, the length of the speech recognition result and the string of search result target words is a value corresponding to the speech recognition result and the number of two-syllable concatenations of the string of search result target words, for example, the square root of the sum of the number of two-syllable concatenations.

For simple description, when the matching of the speech recognition result and the string of search result target words for calculating the cosine distance D is performed by using the notation symbols in the word unit, the calculation of the cosine distance D, that is, the degree of similarity in Formula (1) includes, for example, a string of words that is the same as the speech recognition result because division by the magnitude |VTITLE(i)| of the search result target vector VTITLE (i), but in the long (a larger number of words) string of search result target words and the short string of search result target words, the degree of similarity to the short string of search result target words increases (the cosine distance D increases) while the degree of similarity to the long string of search result target words decreases (the cosine distance D decreases).

Therefore, even if a portion of the long string of search result target words is acquired as the speech recognition result, the degree of similarity between the speech recognition result and the long string of search result target words does not increase and the string of search result target words is not output as a string of search result words, such that the accuracy in search of the string of wards corresponding to the input voice is not deteriorated.

That is, for example, when a portion of a long title is uttered, the degree of similarity of the long title does not increase and the long title is not output as a string of search result words.

Further, for the same reason, although the same string of words as a string of predetermined search result target words, in a long speech recognition result and a short speech recognition result, the degree of similarity between the long speech recognition result and the short search target words decreases, while the degree of similarity between the short speech recognition result and the string of predetermined search result target words increases.

Therefore, for a long speech recognition result, which includes a string of words the same as a string of predetermined search result target words though, the degree of similarity of the string of predetermined search result target words does not increase and the string of predetermined search result target words is not output as a string of search result words, such that the accuracy in search of a string of words corresponding to an input voice is deteriorated.

That is, for example, when a portion of a short title is uttered, the degree of similarity of the short title does not increase and the short title is not output as a string of search result words.

In the matching unit 56 (FIG. 2), a correction distance of the cosine distance D may be selected as the degree of similarity between the speech recognition result and the string of search result target words, in order to reduce the influence on the difference in length of the speech recognition result and the string of search result target words.

When the correction distance is selected as the degree of similarity between the speech recognition result and the string of search result target words, the degree of similarity between the speech recognition result and the long string of search result target words and the degree of similarity between the long speech recognition result and the string of search result target words are prevented from decreasing, such that the search for the string of words corresponding to the input voice can be robustly performed, and accordingly, it is possible to prevent the accuracy in search for the string of words corresponding to the input voice from being deteriorated.

There are a first correction distance and a second correction distance as correction distances.

The first correction distance is acquired by using the value |VUTR|×√(|VTITLE(i)|/|VUTR|) that is not proportionate to the length of the string of search result target words, that is, the square root of the multiplicity √(|VTITLE(i)||VUTR|) of the magnitude |VUTR| of the recognition result vector VUTR and the magnitude |VTITLE(i)| of the search result target vector VTITLE(i), instead of the magnitude |VTITLE(i)| of the search result target vector VTITLE(i) that is proportionate to the length of the string of search result target words, in the calculation of Formula (1) acquiring the cosine distance D.

The value used instead of the magnitude of |VTITLE(i)| of the search result target vector VTITLE(i) in the calculation of Formula (1) acquiring the cosine distance D is also called a substitute size S(i), hereafter.

The first correction distance D1 is acquired by Formula (2).

$$D1 = VUTR \cdot VTITLE(i) / (|VUTR|S(i)) \quad (2)$$
$$= VUTR \cdot VTITLE(i) / (|VUTR||VUTR| \times \sqrt{(|VTITLE(i)|/|VUTR|)})$$
$$= VUTR \cdot VTITLE(i) / (|VUTR|\sqrt{(|VTITLE(i)||VUTR|)})$$

In Formula (2), the square root of the multiplicity √(|VTITLE(i)||VUTR|) of the magnitude |VUTR| of the recognition result vector VUTR and the magnitude |VTITLE(i)| of the search result target vector VTITLE(i) is larger than |VTITLE(i)|, when |VTITLE(i)| is small, that is, when the length of the string of search result target words is short, but is smaller than |VTITLE(i)|, when the |VTITLE(i)| is large, that is, when the length of the string of search result target words is large.

As a result, the first correction value D1 acquired from Formula (2) is a value that is less influenced by the difference in the magnitude |VTITLE(i)| of the search result target vector VTITLE(i) that is the length of the string of search result target words corresponding to the length of the speech recognition result, as compared with the cosine distance D acquired from Formula (1), that is, a value that is less influenced by the difference in length between the speech recognition result and the string of search result target words.

The second correction distance is acquired by using the magnitude |VUTR| of the recognition result vector VUTR as a substitute size S(i), instead of the magnitude of |VTITLE(i)| of the search result target vector VTITLE(i), which is proportionate to the length of the search result target word, in calculation of Formula (1) acquiring the cosine distance D.

Therefore, the second correction distance D2 is acquired from Formula (3).

$$D2 = VUTR \cdot VTITLE(i) / (|VUTR|S(i)) \quad (3)$$
$$= VUTR \cdot VTITLE(i) / |VUTR|^2$$

Since the second correction distance D2 is acquired without using the magnitude |VTITLE(i)| of the search result target vector VTITLE(i), the second correction distance D2 is a value that is not influenced by the difference in the magnitude |VTITLE(i)| of the search result vector VTITLE(i), which is the length of the string of search result target words corresponding to the length of the speech recognition result, that is, a value that is less influenced by the difference in length between the speech recognition result and the string of search result target words.

FIG. 7 is a showing the result of simulation of matching that uses a cosine distance D, a first correction distance D1, and a second correction distance D2, as the degree of similarity between a speech recognition result and a string of search result target words.

Further, in the simulation of FIG. 7, a correct speech recognition result "SEKAI ISAN (world heritage)" is acquired for a short utterance "SEKAI ISAN", such that a long title "ZA SEKAI ISAN TOSHI NO ISAN SUPESHARU ITARIA ROMA BENECHIA (the feature program about the heritage of world heritage cities, Rome and Venice, Italy)" and a short title "SEKAI JOSEI (world affairs)" are selected as program titles for strings of search result target words.

Further, matching is performed in the word unit by using the notation symbols.

Further, in FIG. 7, the words, which agree with words "SEKAI/ISAN (heritage of world)" of a speech recognition result "SEKAI ISAN", of a program title which is a string of search result target words, are underlined.

For the title "ZA SEKAI ISAN TOSHI NO ISAN SUPESHARU ITARIA ROMA BENECHIA", two words "SEKAI (world)" and "ISAN (heritage)" agree with the speech recognition result "SEKAI ISAN".

On the other hand, in a title "SEKAI JOSEI", only one word "SEKAI" agrees with the speech recognition result "SEKAI ISAN".

Therefore, in the title "ZA SEKAI ISAN TOSHI NO ISAN SUPESHARU ITARIA ROMA BENECHIA" and the title "SEKAI JOSEI", it is appropriate that the degree of similarity of the title "ZA SEKAI ISAN TOSHI NO ISAN SUPESHARU ITARIA ROMA BENECHIA" of which the number of words that agree with the speech recognition result "SEKAI ISAN" is higher than the degree of similarity of the title "SEKAI JOSEI".

However, when the cosine distance D is selected as the degree of similarity, for the speech recognition result "SEKAI ISAN" that agrees with a portion "SEKAI ISAN" of the long title "ZA SEKAI ISAN TOSHI NO ISAN SUPESHARU ITARIA ROMA BENECHIA", the degree of similarity of the short title "SEKAI JOSEI" becomes 0.5, while the degree of similarity of the long title "ZA SEKAI ISAN TOSHI NO ISAN SUPESHARU ITARIA ROMA BENECHIA" becomes 0.4472, such that the degree of similarities of the short title "SEKAI JOSEI" is higher than the degree of similarity of the long title "ZA SEKAI ISAN TOSHI NO ISAN SUPESHARU ITARIA ROMA BENECHIA".

That is, when the cosine distance D is selected as the degree of similarity, the degree of similarity of the long title "ZA SEKAI ISAN TOSHI NO ISAN SUPESHARU ITARIA ROMA BENECHIA" that appropriate for the speech recognition result "SEKAI ISAN" is not high by the influence of the difference between the length of the short speech recognition result "SEKAI ISAN" that agrees with the "SEKAI ISAN" that is a portion of the long title "ZA SEKAI ISAN TOSHI NO ISAN SUPESHARU ITARIA ROMA BENECHIA" as the length of the long title.

Meanwhile, when the correction distance is selected as the degree of similarity, the degree of similarity of the long title "ZA SEKAI ISAN TOSHI NO ISAN SUPESHARU ITARIA ROMA BENECHIA" is higher than the degree of similarity of the short title "SEKAI JOSEI".

That is, when the first correction distance D1 is selected as the degree of similarity, for the speech recognition result "SEKAI ISAN", the degree of similarity of the short title "SEKAI JOSEI" is 0.5 while the degree of similarity of the long title "ZA SEKAI ISAN TOSHI NO ISAN SUPESHARU ITARIA ROMA BENECHIA" is 0.6687, such that the degree of similarity of the long title "ZA SEKAI ISAN TOSHI NO ISAN SUPESHARU ITARIA ROMA BENECHIA" is higher than the degree of similarity of the short title "SEKAI JOSEI".

Further, when the second correction distance D2 is selected as the degree of similarity, for the speech recognition result "SEKAI JOSEI", the degree of similarity of the short title "SEKAI JOSEI" is 0.5 while the degree of similarity of the long title "ZA SEKAI ISAN TOSHI NO ISAN SUPESHARU ITARIA ROMA BENECHIA" is 1.0, such that the degree of similarity of the long title "ZA SEKAI ISAN TOSHI NO ISAN SUPESHARU ITARIA ROMA BENECHIA" is higher than the degree of similarity of the short title "SEKAI JOSEI".

As described above, when the correction distances are selected as the degree of similarity, the influence due to the difference between length of the speech recognition result that agrees with a portion of the long string of search result target words and the length of the long string of search result target words is reduced, such that the degree of similarity of the appropriate long title "ZA SEKAI ISAN TOSHI NO ISAN SUPESHARU ITARIA ROMA BENECHIA" is higher, for the speech recognition result "SEKAI ISAN (world heritage)".

Figure 8:
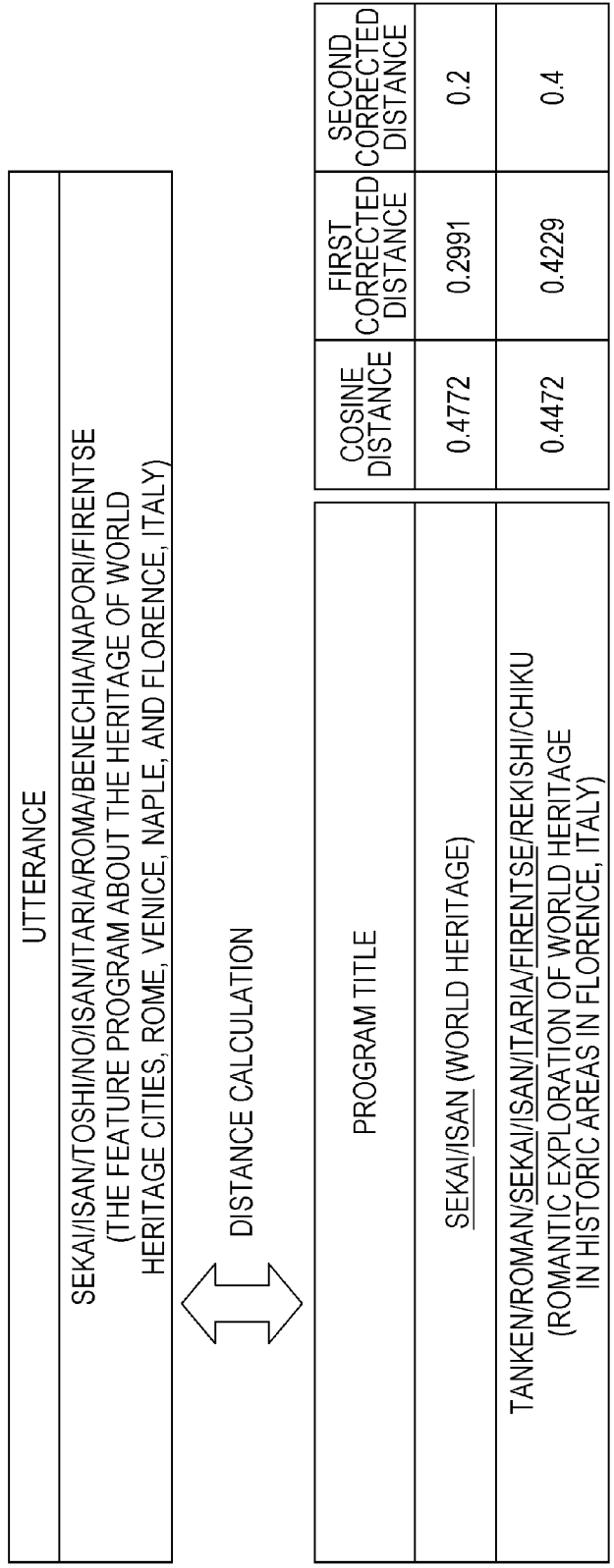
FIG. 8 is view showing the result of another simulation of matching that uses a cosine distance D1, a first correction distance D1, and a second correction distance D2, as degree of similarity between a speech recognition result and a string of search result target words.

FIG. 8 is a diagram showing the result of different simulation of matching that selects a cosine distance D, a first correction distance D1, and a second correction distance D2, as the degree of similarity between a speech recognition result and a string of search result target word.

Further, in the simulation of FIG. 8, a correct speech recognition result "SEKAI ISAN TOSHI NO ISAN ITARIA ROMA BENECHIA NAPORI FIRENTSE (heritage of world heritage cities special, Rome, Venice, Naples, and Florence, Italy)" is acquired for a long utterance "SEKAI ISAN TOSHI NO ISAN ITARIA ROMA BENECHIA NAPORI FIRENTSE" while a short title "SEKAI ISAN" and a long title "TANKEN ROMAN SEKAI ISAN ITARIA FIRENTSE REKISHI CHIKU (romantic exploration of world heritage in historic areas in Florence, Italy)" are selected as program titles that are strings of search result target words.

Further, matching is performed in the word unit by using the notation symbols.

Further, in FIG. 8, the words, which agree with words "SEKAI/ISAN/TOSHI/NO/ISAN/ITARIA/ROMA/BENECHIA/NAPORI/FIRENTSE (world/heritage/cities/of/heritage/Italy/Rome/Venice/Naples/Florence)" of a speech recognition result "SEKAI ISAN TOSHI NO ISAN ITARIA ROMA BENECHIA NAPORI FIRENTSE", of a program title, which is a string of search result target words, are underlined.

For the title "SEKAI ISAN", two words "SEKAI (world)" and "ISAN (heritage)" agree with the speech recognition result "SEKAI ISAN TOSHI NO ISAN ITARIA ROMA BENECHIA NAPORI FIRENTSE".

Meanwhile, for the title "TANKEN ROMAN SEKAI ISAN ITARIA FIRENTSE REKISHI CHIKU", four words, "SEKAI", "ISAN (heritage)", "ITARIA (Italy)", and "FIRENTSE (Florence)" agree with the speech recognition result "SEKAI ISAN TOSHI NO ISAN ITARIA ROMA BENECHIA NAPORI FIRENTSE".

Therefore, in the title "SEKAI ISAN" and the title "TANKEN ROMAN SEKAI ISAN ITARIA FIRENTSE REKISHI CHIKU", it is appropriate that the degree of similarity of the title "TANKEN ROMAN SEKAI ISAN ITARIA FIRENTSE REKISHI CHIKU" of which the number of words that agree with the speech recognition result "SEKAI ISAN TOSHI NO ISAN ITARIA ROMA BENECHIA NAPORI FIRENTSE" is larger is higher than the degree of similarity of the title "SEKAI ISAN".

However, when the cosine distance D is selected as the degree of similarity, for the long speech recognition result "SEKAI ISAN TOSHI NO ISAN ITARIA ROMA BENECHIA NAPORI FIRENTSE", the degree of similarity of the long title "TANKEN ROMAN SEKAI ISAN ITARIA FIRENTSE REKISHI CHIKU" is 0.4472 while the degree of similarity of the short title "SEKAI ISAN" is 0.4772, such that the degree of similarity of the long title "TANKEN ROMAN SEKAI ISAN ITARIA FIRENTSE REKISHI CHIKU" is not higher than the degree of similarity of the short title "SEKAI ISAN".

That is, when the cosine distance D is selected as the degree of similarity, the degree of similarity of the appropriate long title "TANKEN ROMAN SEKAI ISAN ITARIA FIRENTSE REKISHI CHIKU" for the speech recognition result "SEKAI ISAN TOSHI NO ISAN ITARIA ROMA BENECHIA NAPORI FIRENTSE" is not high, by the influence due to the difference between the length of the long speech recognition result "SEKAI ISAN TOSHI NO ISAN ITARIA ROMA BENECHIA NAPORI FIRENTSE" and the short string of search result target words "SEKAI ISAN".

Meanwhile, when the correction distance is selected as the degree of similarity, the degree of similarity of the long title "TANKEN ROMAN SEKAI ISAN ITARIA FIRENTSE REKISHI CHIKU" is higher than the degree of similarity of the short title "SEKAI ISAN".

That is, when the first correction distance D1 is selected as the degree of similarity, for the long speech recognition result "SEKAI ISAN TOSHI NO ISAN ITARIA ROMA BENECHIA NAPORI FIRENTSE", the degree of similarity of the long title "TANKEN ROMAN SEKAI ISAN ITARIA FIRENTSE REKISHI CHIKU" is 0.4229 while the degree of similarity of the short title "SEKAI ISAN" is 0.2991, such that the degree of similarity of the long title "TANKEN ROMAN SEKAI ISAN ITARIA FIRENTSE REKISHI CHIKU" is higher than the degree of similarity of the short title "SEKAI ISAN".

Further, when the second correction distance D2 is selected as the degree of similarity, for the long speech recognition result "SEKAI ISAN TOSHI NO ISAN ITARIA ROMA BENECHIA NAPORI FIRENTSE", the degree of similarity of the long title "TANKEN ROMAN SEKAI ISAN ITARIA FIRENTSE REKISHI CHIKU" is 0.4 while the degree of similarity of the short title "SEKAI ISAN" is 0.2, such that the degree of similarity of the long title "TANKEN ROMAN SEKAI ISAN ITARIA FIRENTSE REKISHI CHIKU" is higher than the degree of similarity of the short title "SEKAI ISAN".

As described above, when the correction distances are selected as the degree of similarity, the influence due to the difference between length of the long speech recognition result and the length of the short string of search result target words is reduced, such that the degree of similarity of the appropriate long title "TANKEN ROMAN SEKAI ISAN ITARIA FIRENTSE REKISHI CHIKU" for the speech recognition result "SEKAI ISAN TOSHI NO ISAN ITARIA ROMA BENECHIA NAPORI FIRENTSE" is high.

Therefore, according to the correction distances, since the influence due to the difference in length of the speech recognition result and the string of search result target words reduces, search of the string of words corresponding to the input voice can be robustly performed, such that it is possible to prevent the accuracy in search of the string of words corresponding to the input voice from being deteriorated.

Further, when the cosine distance D that is proportionate to the scalar product VUTR·VTITLE(i) of the recognition result vector VUTR and the search result target vector VTITLE(i), or the first correction distance D1 or the second correction distance D2 are selected as the degree of similarity, in the matching unit 56, when the scalar product VUTR·VTITLE(i) is acquired, matching symbols that is the matching unit of the string of search result target pronunciation symbols, which agrees with the matching unit of the string of recognition result pronunciation symbols can be acquired.

That is, for example, when matching is performed with two-syllable concatenation (two continuous pronunciation symbols) as the matching unit, in the calculation of the degree of similarity, which is the matching, and when the initial value of the scalar vector VUTR·VTITLE(i) is 0, voice two-concatenations are sequentially selected to noticed two-concatenations for the matching unit of a string of recognition result two-concatenation symbols, and two-syllable concatenation that agrees with the noticed two-concatenations exists in the string of search result target two-concatenation symbols, the scalar product VUTR·VTITLE(i) may be necessary to be increased by 1.

When two-syllable concatenation that agrees with the noticed two-concatenation, which is the matching unit, exists in the string of search result target two-concatenation symbols, the two-syllable concatenation is the match symbols, in the matching unit 56, when the scalar product VUTR·VTITLE(i) is acquired, a match symbol, that is, two-syllable concatenation that agrees with the noticed two-concatenation of the string of recognition result two-concatenation symbols existing in the string of search result target two-concatenation symbols can be acquired.

The match symbol is the matching unit of the string of recognition result pronunciation symbols, in the matching unit (two-syllable concatenation) of the string of search result target pronunciation, and the more the number of match symbols of the string of search result target pronunciation symbols for the string of recognition result pronunciation symbols, the larger the degree of similarity between the string of recognition result pronunciation symbols and the string of search result target pronunciation symbols.

Therefore, since the more the number of match symbols of the string of search result target pronunciation symbols for the string of recognition result pronunciation symbols, the more the string of search result target words of the string of search result target pronunciation symbols is selected as the string of search result words, the match symbol of the (string of search result target pronunciation symbols of) string of search result target words is the reason for that the string of search result target words is selected as the string of search result words.

Further, the match symbol is a pronunciation symbol representing the part, where the pronunciation agrees with the (speech recognition result of) input voice, in the string of search result target words, such that the (word including) part of which the pronunciation is represented by the match symbol can be considered as corresponding to the input voice (the part corresponding to the input voice, in the string of search result target words.

[Process of Voice Search Apparatus 10]

FIG. 9 is a flowchart illustrating a process (voice search process) of the voice search apparatus 10 of FIG. 2.

In Step S11, the voice search apparatus 10 performs a necessary preprocess.

That is, the voice search apparatus 10 performs a process that can be performed before an input voice is supplied, as the preprocess.

The preprocess may be, for example, a process of reading out a program title, a performer's name, and detailed information, which are components constituting an EPG recorded on the recording medium 23 (FIG. 1) and supplying the components to the search result target storing unit 53 to be stored as a string of search result target words.

Further, the preprocess may be a process of converting the string of search result target words stored in the search result target storing unit 53 in to a string of search result target pronunciation symbols (a string of search result target two-concatenation symbols), in the morpheme analyzing unit 54 and the pronunciation symbol conversion unit 55, and supplying the converted result to the matching unit 56, or a process of making a pronunciation symbol-to-word table for the string of search result target words stored in the search result target storing unit 53, in the table making unit 61, and storing the table in the table storing unit 62.

Further, the preprocess of Step S11 is performed at a predetermined time every day. Alternatively, the preprocess of Step S11 is performed, when the recorded program recorded on the recording medium 23 is changed or when the EPG recorded on the recording medium 23 is changed (renewed).

When a user utters and an input voice is supplied to the speech recognition unit 51 by the utterance after the latest preprocess, in Step S12, the speech recognition unit 51 recognizes the input voice supplied thereto.

The speech recognition result that is obtained by the recognition of the input voice in the speech recognition unit 51 is a string of recognition result pronunciation symbols (a string of recognition two-concatenation symbols) through the pronunciation symbol conversion unit 52, and is supplied to the matching unit 56.

The matching unit 56 matches the string of recognition result pronunciation symbols supplied from the speech recognition unit 51 through the pronunciation symbol conversion unit 52 with the string of search result target pronunciation symbols of the string of search result target words obtained by the preprocess in a matching unit of two-syllable concatenation (two continuous pronunciation symbols), for all of the strings of search result target words stored in the search result target storing unit 53, in step S13, and then supplies the matching result to the generation unit 57 and the word selecting unit 63.

That is, the matching unit 56 calculates, for example, the cosine distance or the correction distance, as the degree of similarity to the speech recognition result, for the string of search result target words stored in the search result target storing unit 53, and supplies the degree of similarity to the generation unit 57, as the matching result, together with the string of search result target words (string of search result target words of which the degree of similarity to the speech recognition result is acquired).

Further, the matching unit 56 acquires the two-syllable concatenation that is the matching unit of the string of search result target words that agrees with the two-syllable concatenation that is the matching unit of the string of recognition result pronunciation symbols, when acquiring the cosine distance as the degree of similarity to the speech recognition result, in the string of search result target words stored in the search result target storing unit 53, as the match symbol, and then supplies the match symbol to the word selecting unit 63, as the matching result, together with the string of search result target words (string of search result target words of which the degree of similarity to the speech recognition result is acquired).

The generation unit 57 generates a string of search result words, on the basis of the matching result from the matching unit 56, and supplies the string to the word selecting unit 63 and the emphasis converting unit 64, in step S14.

That is, the generation unit 57 selects the string of search result target word with high degree of similarity or the string of search result target words with a degree of similarity above a predetermined threshold, in the matching result for all of the strings of search result target words stored in the search result target storing unit 53 from the matching unit 56, as a string of search result words for the input voice, and then supplies the selected string to the word selecting unit 63 and the emphasis converting unit 64.

The word selecting unit 63 sequentially selects the string of search result words from the generation unit 57 to the string of noticed words, in step S15.

Further, the word selecting unit 63 detects a word set including the corresponding unit (two or more continuous pronunciation symbols) included in the match symbols of the string of noticed words from the matching unit 56, in a word set, with reference to a word set for a string of search result words (string of search result target words) that is the string of noticed words, in word sets that are sets of the corresponding unit and words, registered in the pronunciation symbol-to-word table stored in the table storing unit 62.

Further, the word selecting unit 63 selects the words (words corresponding to the corresponding unit) included in the word set including the corresponding unit included in the match symbol of the string of noticed words detected from the word set for the string of noticed words, to the emphasis target words that are emphasized in the string of noticed words, and supplies the selected words to the emphasis converting unit 64.

The emphasis converting unit 64 sequentially selects the string of search result words from the generation unit 57 to the string of noticed words, in step S16.

Further, when the emphasis target word are supplied form the word selecting unit 63, for the string of noticed words, the emphasis converting unit 64 converts the string of noticed words into a string of emphasis words in which the emphasis target words are emphasized, by changing the display attribute of the emphasis target words in the string of noticed words.

The string of emphasis words obtained by the emphasis converting unit 64 is supplied from the emphasis converting unit 64 to the output I/F 33 (FIG. 1), and then the voice search apparatus 10 finishes the process of voice search.

Further, when the string of search result target words is, for example, the program title, the performer's name, and the detailed information, and when the degree of similarity to the speech recognition result is high or there is, for example, the performer's name (or the detailed information), other than the title, is in the string of search result target words equal to or more than a threshold, the generation unit 57 can select the program title having the performer's name as metadata, as a string of search result words, together with the performer's name or instead of the performer's name.

[Making of Pronunciation Symbol-to-Word Table]

FIG. 10 is a view showing an example of a pronunciation symbol-to-word table made by a table making unit 61 of FIG. 2.

In the pronunciation symbol-to-word table, word sets corresponding to the words in the string of search result target words, including the two or more continuous pronunciation symbols as the corresponding units corresponding to the words, and the corresponding units and at least a portion of the corresponding units in the pronunciation symbols in the string of search result target words stored in the search result target storing unit 53, are stored, as described above.

For example, for a simple description, when the two-syllable concatenation that is the two continuous pronunciation symbols the same as the matching unit is selected as the corresponding unit, the word set shown in FIG. 10 is registered in the pronunciation symbol-to-word table, for example, for the string of search result target words "TOSHI NO SE KAISAN (dissolution of Diet at the end of year)".

That is, the pronunciation symbols of the string of search result target words "TOSHI NO SE KAISAN" are "TO-SHI-NO-SE-KA-I-SA-N" and the two-syllable concatenation that is the corresponding unit for the string of search result target words "TOSHI NO SE KAISAN" can be acquired in the same manner as the two-syllable concatenation as the matching unit shown in FIG. 4 or FIG. 5.

In detail, for the string of search result target words "TOSHI NO SE KAISAN", the two-syllable concatenation that is the corresponding unit can be acquired by extracting two syllables of a noticed syllable and a syllable right after the noticed syllable while moving back the noticed syllable (pronunciation symbol) back by one syllable, from the head of the pronunciation symbol "TO-SHI-NO-SE-KA-I-SA-N".

That is, for the string of search result target words "TOSHI NO SE KAISAN", it is possible to acquire two-syllable concatenations "TO-SHI", "SHI-NO", "NO-SE", "SE-KA", "KA-I", "I-SA", and "SA-N", as the corresponding units.

Further, in the pronunciation symbol-to-word table, the corresponding units are registered as a word set corresponding to the words of the string of search result target words, including at least a portion of the corresponding units in the pronunciation symbol.

In FIG. 10, the corresponding unit "TO-SHI" for the string of search result target words "TOSHI NO SE KAISAN" is registered as the word set [TO-SHI: TOSHI NO SE], corresponding to the words "TOSHI NO SE" of the string of search result target words "TOSHI NO SE KAISAN", including the corresponding unit "TO-SHI" in the pronunciation symbols.

In FIG. 10, the corresponding unit "SHI-NO" for the string of search result target words "TOSHI NO SE KAISAN" is registered as the word set [SHI-NO: TOSHI NO SE], corresponding to the words "TOSHI NO SE" of the string of search result target words "TOSHI NO SE KAISAN", including the corresponding unit "SHI-NO" in the pronunciation symbols.

Further, in FIG. 10, the corresponding unit "NO-SE" for the string of search result target words "TOSHI NO SE KAISAN" is registered as the word set [NO-SE: TOSHI NO SE], corresponding to the words "TOSHI NO SE" of the string of search result target words "TOSHI NO SE KAISAN", including the corresponding unit "NO-SE" in the pronunciation symbols.

Further, in FIG. 10, the corresponding unit "SE-KA" for the string of search result target words "TOSHI NO SE KAISAN" is registered as the word set [SE-KA: TOSHI NO SE], corresponding to the words "TOSHI NO SE" of the string of search result target words, including a portion [SE] of the corresponding unit "SE-KA" in the pronunciation symbols.

Similarly, in FIG. 10, the corresponding units "KA-I", "I-SA", and "SA-N" of the string of search result target words "TOSHI NO SE KAISAN" are registered as word sets [KA-I: KAISAN], [I-SA: KAISAN], and [SA-N: KAISAN, corresponding to the word "KAISAN" of the string of search result target words "TOSHI NO SE KAISAN", including at least a portion of the corresponding units in the pronunciation symbols.

For the generation unit 57, when the string of search result target words "TOSHI NO SE KAISAN" is selected as the string of search result words corresponding to the input voice, in the word selecting unit 63, emphasis target words that are emphasized in the string of search result words are selected with reference to the word sets in the string of search result words (string of search result target words) "TOSHI NO SE KAISAN" registered in the pronunciation symbol-to-word table of FIG. 10.

That is, for example, when two-syllable concatenation "TO-SHI", "SHI-NO", "NO-SE", or "SE-KA" is supplied from the matching unit 56 to the word selecting unit as matching symbols of the string of search result words "TOSHI NO SE KAISAN", in the word selecting unit 63, a word "TOSHI NO SE" included in the word set [TO-SHI: TOSHI NO SE], [SHI-NO: TOSHI NO SE], [NO-SE: TOSHI NO SE], or [SE-KA: TOSHI NO SE] including the matching symbol "TO-SHI", "SHI-NO", "NO-SE", or "SE-KA" in the word sets of the string of search result words "TOSHI NO SE KAISAN", is selected as a emphasis target word.

Further, for example, when two-syllable concatenation "KA-I", "I-SA", or "SA-N" is supplied from the matching unit 56 to the word selecting unit 63, as matching symbols of the string of search result words "TOSHI NO SE KAISAN", a word "KAISAN" included in the word set [KA-I: KAI-SAN], [I-SA: KAISAN], or [SA-N: KAISAN] including the matching symbol "KA-I", "I-SA", or "SA-N" in the word sets of the string of search result words "TOSHI NO SE KAI-SAN", is selected as emphasis target word in the word selecting unit 63.

FIG. 11 is a view illustrating a first making method when the table making unit 61 of FIG. 2 makes a pronunciation symbol-to-word table.

For example, a morpheme analysis result of the string of search result target words "SEKAI ISAN GENTEN HE NO KAIKI (world heritage, back to the starting point)" is supplied from the morpheme analyzing unit 54 to the table making unit 61.

Sets of words and sounds (phonemes) "SEKAI, SE-KA-I"; "ISAN, I-SA-N"; "GENTEN, GE-N-TE-N"; "HE, E"; "NO, NO"; and "KAIKI (back to), KA-I-KI" constituting the string of search result target words "SEKAI ISAN GENTEN HE NO KAIKI" are included in the morpheme analysis result of the string of search result target words "SEKAI ISAN GEN-TEN HE NO KAIKI".

The table making unit 61 acquires (a string of) pronunciation symbols representing the pronunciations of words and the number S of pronunciation symbols of the words on the basis of the sounds of the words, for the words "SEKAI (world)", "ISAN (heritage)", "GENTEN (starting point)", "HE", "NO", and "KAIKI" constituting the string of search result target words "SEKAI ISAN GENTEN HE NO KAIKI".

In the embodiment, the pronunciation symbols of the words are the same as the syllables of the words, the number S of pronunciation symbols of the words is the same of the number of syllables of the words.

Further, the table making unit 61 implements the string of search result target words "SE-KA-I-I-SA-N-GE-N-TE-N-E-NO-KA-I-KI" by arranging the pronunciation symbols "SEKAI (world)", "ISAN (heritage)", "GENTEN", "HE", "NO", and "KAIKI", which constitute the string of search result target words "SEKAI ISAN GENTEN HE NO KAIKI".

Further, the table making unit 61 generates two-syllable concatenation series (hereafter, also called a corresponding unit series) "SE-KA", "KA-I", "I-I", "I-SA", "SA-N", "N-GE", "GE-N", "N-TE", "TE-N", "N-E", "E-NO", "NO-KA", "KA-I", and "I-KI" as the corresponding unit from the string of search result target pronunciation symbols "SE-KA-I-I-SA-N-GE-N-TE-N-E-NO-KA-I-KI".

Further, the table making unit 61 selects the first word "SEKAI" of the string of search result target words "SEKAI ISAN GENTEN HE NO KAIKI", as a noticed word.

Further, the table making unit 61 implements word sets [SE-KA: SEKAI], [KA-I: SEKAI], and [I-I: SEKAI] that fit to the number S of pronunciation symbols of the noticed word "SEKAI" by corresponding the noticed word "SEKAI" to the three corresponding units "SE-KA", "KA-I", and "I-I" that is the same as the number of pronunciation symbols of the noticed word "SEKAI" from the head of the series of corresponding units, and registers the word sets in the pronunciation symbol-to-word table, as word sets for the string of search result target words "SEKAI ISAN GENTEN HE NO KAIKI".

Thereafter, the table making unit 61 generates a new series of corresponding units "I-SA", "SA-N", "N-GE", "GE-N", "N-TE", "TE-N", "N-E", "E-NO", "NO-KA", "KA-I", and "I-KI", by deleting the three corresponding units "SE-KA", "KA-I", and "I-I" of the word sets from the series of corresponding units of the string of search result target words "SEKAI ISAN GENTEN HE NO KAIKI".

Further, the table making unit 61 newly selects the second word "ISAN (heritage)" of the string of search result target words "SEKAI ISAN GENTEN HE NO KAIKI", as a noticed word.

Further, the table making unit 61 implements word sets [I-SA: ISAN], [SA-N: ISAN], and [N-GE: ISAN] that fit to the number of pronunciation symbols of the noticed word "ISAN" by corresponding the noticed word "ISAN" to the three corresponding units "I-SA", "SA-N", and "N-GE" that is the same as the numbers of pronunciation symbols of the noticed word "ISAN", from the head of a (new) series of corresponding units, and registers the word sets in the pronunciation symbol-to-word table, as word sets for the string of search result target words "SEKAI ISAN GENTEN HE NO KAIKI".

Thereafter, the table making unit 61 generates a new series of corresponding units "GE-N", "N-TE", "TE-N", "N-E", "E-NO", "NO-KA", "KA-I", and "I-KI", by deleting the three corresponding units "I-SA", "SA-N", and "N-GE" of the word sets from the series of corresponding units of the string of search result target words "SEKAI ISAN GENTEN HE NO KAIKI".

Further, the table making unit 61 newly selects the third word "GENTEN" of the string of search result target words "SEKAI ISAN GENTEN HE NO KAIKI", as a noticed word.

Further, the table making unit 61 implements word sets [GE-N: GENTEN], [N-TE: GENTEN], [TE-N: GENTEN], and [N-E: GENTEN] that fit to the number S of pronunciation symbols of the noticed word "ISAN" by corresponding the noticed word "GENTEN" to the four corresponding units "GE-N", "N-TE", "TE-N", and "N-E" that is the same as the number of pronunciation symbols of the noticed word "GEN-TEN", from the head of a (new) series of corresponding units, and registers the word sets in the pronunciation symbol-to-word table, as word sets for the string of search result target words "SEKAI ISAN GENTEN HE NO KAIKI".

Thereafter, the table making unit 61 generates a new series of corresponding units "E-NO", "NO-KA", "KA-I", and "I-KI" by deleting the four corresponding units "GE-N", "N-TE", "TE-N", and "N-E" of the word set from the string of search result target words of the string of corresponding units "SEKAI ISAN GENTEN HE NO KAIKI", and implements the word sets of the series of search result corresponding words "SEKAI ISAN GENTEN HE NO KAIKI" by repeating the same process until the corresponding units of the series of corresponding units are removed, and registers the word sets in the pronunciation symbol-to-word table.

Further, when the number of corresponding units of the series of corresponding units is less than the number S of pronunciation symbols of the noticed word, the same number of word sets as that of the corresponding units constituting the corresponding unit are implemented for the noticed word.

That is, when the last word "KAIKI" of the string of search result target words "SEKAI ISAN GENTEN HE NO KAIKI" is selected as the noticed word, the series of corresponding unit is composed of corresponding units "KA-I" and "I-KI".

Therefore, the number of corresponding units of the series of corresponding units is two, which is less than three, which is the number S of pronunciation symbols of the noticed word "KAIKI".

In this case, in the table making unit 61, the noticed word "KAIKI" is made to correspond to the two corresponding units "KA-I" and "I-KI", respectively, of the series of corresponding units and two word sets [KA-I: KAIKI] and [I-KI: KAIKI] that is less than the number S of the pronunciation symbols of the noticed word "KAIKI" is implemented, such that they are registered in the pronunciation symbol-to-word table, as word sets for the string of search result target words "SEKAI ISAN GENTEN HE NO KAIKI".

As described above, the table making unit 61 implements word sets of all the corresponding units "SE-KA", "KA-I", "I-I", "I-SA", "SA-N", "N-GE", "GE-N", "N-TE", "TE-N", "N-E", "E-NO", "NO-KA", "KA-I", and "I-KI" of the string of search result target word "SEKAI ISAN GENTEN HE NO KAIKI", and registers the word sets in the pronunciation symbol-to-word table.

Further, when a plurality of the same (pronunciation symbols of) corresponding units exist in the corresponding units of the string of search result target words "SEKAI ISAN GENTEN HE NO KAIKI", the table making unit 61 merges the plurality of the word sets including the same corresponding units into one word set.

As described above, in the corresponding units "SE-KA", "KA-I", "I-I", "I-SA", "SA-N", "N-GE", "GE-N", "N-TE", "TE-N", "N-E", "E-NO", "NO-KA", "KA-I", and "I-KI" of the string of search result target words "SEKAI ISAN GENTEN HE NO KAIKI", the second corresponding unit "KA-I" and the thirteenth corresponding unit "KA-I" are the same.

In this case, the word set [KA-I: SEKAI] including the second corresponding word "KA-I" and the word set [KA-I: KAIKI] including the thirteenth corresponding unit "KA-I" are merged into one word set [KA-I: SEKAI, KAIKI].

As a result, the corresponding unit "KA-I" correspond to both words "SEKAI (world)" and "KAIKI".

FIG. 12 is a flowchart illustrating a process of making the pronunciation symbol-to-word table in the first making method.

In step S31, the table making unit 61 takes a morpheme analysis result of a string of noticed words from the morpheme analyzing unit 54 by selecting a string of search result target words where a morpheme analysis result is supplied from the morpheme analyzing unit 54, as the string of noticed words, in the strings of search result target words stored in the search result target storing unit 53, and the process progresses to step S32.

In step S32, the table making unit 61 acquires a string of search result target pronunciation symbols of the string of noticed words (converts the string of noticed words into a string of search result target pronunciation symbols) by acquiring (a string of) pronunciation symbols of the words of the string of noticed words on the basis of the morpheme analysis result of the string of noticed words from the morpheme analyzing unit 54, and arranging the pronunciation symbols.

Further, the table making unit 61 generates a series of corresponding units that is a series of corresponding unit from the string of search result target pronunciation symbols of the string of noticed words, and the process progresses from step S32 to step S33.

In step S33, the table making unit 61 selects the head word, which is not selected as a noticed word in the words of the string of noticed words, as a noticed word.

Further, the table making unit 61 acquires the number S of pronunciation symbols of the noticed word from the morpheme analysis result of the noticed word and the process progresses from step S33 to step S34.

In step S34, the table making unit 61 matches the noticed word with the corresponding units as much as the number S of pronunciation symbols of the noticed word from the head of the series of corresponding words, implements the same number of word sets as the number S of pronunciation symbols of the noticed word, and registers the word sets in the pronunciation symbol-to-word table, as word sets for the string of noticed words.

When the number of corresponding units of the series of corresponding units is less than the number S of pronunciation symbols of the noticed word, in step S34, the table making unit 61 implements the same number of word sets as the number of corresponding units of the series of corresponding units, by matching the noticed word with all the corresponding units of the series of corresponding units.

Thereafter, the process progresses from step S34 to step S35 and the table making unit 61 generates a new series of corresponding units by removing the corresponding units of the word sets in step S34 from the series of corresponding units of the string of noticed word, and the process progresses to step S36.

In step S36, the table making unit 61 determines whether there is a word that is not selected as a noticed word, in the words of the string of noticed words.

In step S36, when it is determined there is a word that is not selected as a noticed word in the words of the string of noticed words, the process returns to step S33, and as described above, the head word, which is not selected as a noticed word in the words of the string of noticed words, is selected as noticed word, and this process is repeated thereafter.

Further, in step S36, it is determined there is no word that is not selected as a noticed word in the words of the string of noticed words, that is, when all of the words of the string of noticed words are selected as noticed words, the process progresses to step S37 and the table making unit 61 merges the words of the string of noticed words registered in the pronunciation symbol-to-word table into word sets, if necessary.

That is, in step S37, when word sets including the same (pronunciation symbols) corresponding units exist in the word sets of the string of noticed words registered in the pronunciation symbol-to-word table, the table making unit 61 merges the word sets including the same corresponding units into one word set, as illustrated in FIG. 11.

Further, the process progresses from step S37 to step S38 while the table making unit 61 determines whether there is a string of search result target words, which is not selected as a string of noticed words, in the strings of search result target words stored in the search result target storing unit 53.

In step S38, when it is determined that there is a string of search result target word, which is not selected as a string of noticed words, in the strings of search result target words stored in the search result target storing unit 53, the table making unit 61 waits for that a morpheme analysis result is supplied from the morpheme analyzing unit 54, returns to step S31, and selects the string of search result target words where the morpheme analysis result is supplied from the morpheme analyzing unit 54 as a string of noticed words, and this process is repeated thereafter.

Further, in step S38, when it is determined that there is no string of search result target words, which is not selected as a string of noticed words, in the strings of search result target words stored in the search result target storing unit 53, that is, when all of the words of the string of search result target words stored in the search result target storing unit 53 are merged into word sets and registered in the pronunciation symbol-to-word table, the process progresses to step S39 and the table making unit 61 outputs the pronunciation symbol-to-word table (to the table storing unit 62), and the process is finished.

FIG. 13 is a view illustrating a second making method when the table making unit 61 of FIG. 2 makes a pronunciation symbol-to-word table.

For example, similar to that shown in FIG. 11, a morpheme analysis result of the string of search result target words "SEKAI ISAN GENTEN HE NO KAIKI (world heritage, back to the starting point)" is supplied from the morpheme analyzing unit 54 to the table making unit 61.

The table making unit 61, similar to that shown in FIG. 11, acquires (a string of) pronunciation symbols representing the pronunciations of words on the basis of the sounds of the words for the words "SEKAI (world)", "ISAN (heritage)", "GENTEN", "HE", "NO", and "KAIKI (back to)" constituting the string of search result target words "SEKAI ISAN GENTEN HE NO KAIKI", and implements a string of search result target pronunciation symbols "SE-KA-I-I-SA-N-GE-N-TE-N-E-NO-KA-I-KI" by arranging the pronunciation symbols.

Further, similar to that shown in FIG. 11, the table making unit 61 generates corresponding units, that is, a series of corresponding units "SE-KA", "KA-I", "I-I", "I-SA", "SA-N", "N-GE", "GE-N", "N-TE", "TE-N", "N-E", "E-NO", "NO-KA", "KA-I", and "I-KI" from the string of search result target pronunciation symbols "SE-KA-I-I-SA-N-GE-N-TE-N-E-NO-KA-I-KI".

Further, the table making unit 61 generates a series of one character tags "SE-KA-I-I-SA-N-GE-N-TE-N-E-NO-KA-I" that is a series of arranged tags of the corresponding units by extracting the first pronunciation symbols as tags of the corresponding units from the corresponding units of the series of corresponding units.

Thereafter, the table making unit 61 selects the first word "SEKAI (world)" of the string of search result target words "SEKAI ISAN GENTEN HE NO KAIKI", as a noticed word.

Further, the table making unit 61 selects one pronunciation symbol "SE", which is at the head and not selected as a noticed symbol, as a noticed symbol, from the pronunciation symbol "SE-KA-I" of the noticed word "SEKAI".

Further, the table making unit 61 detects the first tag "SE" that agrees with the noticed symbol "SE" from the head to the end of the series of one character tags "SE-KA-I-I-SA-N-GE-N-TE-N-E-NO-KA-I" of the string of search result target words "SEKAI ISAN GENTEN HE NO KAIKI".

Further, the table making unit 61 implements a word set [SE-KA: SEKAI] by corresponding the corresponding unit "SE-KA" provided with the first tag agreeing with the noticed symbol "SE" to the noticed word "SEKAI", and registers the word sets in the pronunciation symbol-to-word table as a word set of the string of search result target words "SEKAI ISAN GENTEN HE NO KAIKI".

Thereafter, the table making unit 61 deletes the tag "SE" of the corresponding unit "SE-KA" corresponding to the noticed word "SEKAI" from the series of one character tags "SE-KA-I-I-SA-N-GE-N-TE-N-E-NO-KA-I" of the string of search result target words "SEKAI ISAN GENTEN HE NO KAIKI", and generates a new series of one character tags "KA-I-I-SA-N-GE-N-TE-N-E-NO-KA-I".

Further, the table making unit 61 selects one pronunciation symbol "KA", which is at the head and not selected as a noticed symbol, as a noticed symbol, from the pronunciation symbol "SE-KA-I" of the noticed word "SEKAI".

Further, the table making unit 61 detects the first tag "KA" that agrees with the noticed symbol "KA" from the head to the end of the series of one character tags "KA-I-I-SA-N-GE-N-TE-N-E-NO-KA-I" of the string of search result target words "SEKAI ISAN GENTEN HE NO KAIKI".

Further, the table making unit 61 implements a word set [KA-I: SEKAI] by corresponding the corresponding unit "KA-I" provided with the first tag agreeing with the noticed symbol "KA to the noticed word "SEKAI", and registers the word sets in the pronunciation symbol-to-word table, as a word set of the string of search result target words "SEKAI ISAN GENTEN HE NO KAIKI".

Thereafter, the table making unit 61 deletes the tag "SE" of the corresponding unit "SE-KA" corresponding to the noticed word "SEKAI" from the series of one character tags "KA-I-I-SA-N-GE-N-TE-N-E-NO-KA-I" of the string of search result target words "SEKAI ISAN GENTEN HE NO KAIKI", and generates a new series of one character tags "I-I-SA-N-GE-N-TE-N-E-NO-KA-I".

Further, the table making unit 61 selects one pronunciation symbol "I", which is at the head and not selected as a noticed symbol, as a noticed symbol from the pronunciation symbol "SE-KA-I" of the noticed word "SEKAI".

Further, the table making unit 61 detects the first tag "I" that agrees with the noticed symbol "I" from the head to the end of the series of one character tags "I-I-SA-N-GE-N-TE-N-E-NO-KA-I" of the string of search result target words "SEKAI ISAN GENTEN HE NO KAIKI".

Further, the table making unit 61 implements a word set [I-I: SEKAI] by corresponding the corresponding unit "I-I" provided with the first tag agreeing with the noticed symbol "I" to the noticed word "SEKAI", and registers the word sets in the pronunciation symbol-to-word table, as a word set of the string of search result target words "SEKAI ISAN GENTEN HE NO KAIKI".

Thereafter, the table making unit 61 deletes the tag "I" of the corresponding unit "I-I" corresponding to the noticed word "SEKAI" from the series of one character tags "I-I-SA-N-GE-N-TE-N-E-NO-KA-I" of the string of search result target words "SEKAI ISAN GENTEN HE NO KAIKI", and generates a new series of one character tags "I-SA-N-GE-N-TE-N-E-NO-KA-I".

Further, the table making unit 61, as described above, selects one pronunciation symbol, which is at the head and not selected as a noticed symbol, as a noticed symbol, from the pronunciation symbol "SE-KA-I" of the noticed word "SEKAI" and there is no pronunciation symbol that is not selected as a noticed symbol, in the pronunciation symbol "SE-KA-I" of the noticed word "SEKAI".

When there is no pronunciation symbol that is not selected as a noticed symbol, in the pronunciation symbol of the noticed word, the table making unit 61 selects the second word "ISAN (heritage)" of the string of search result target words "SEKAI ISAN GENTEN HE NO KAIKI" as a noticed word.

Further, the table making unit 61 selects one pronunciation symbol "I", which is at the head and not selected as a noticed symbol, as a noticed symbol, from the pronunciation symbol "I-SA-N" of the noticed word "ISAN".

Further, the table making unit 61 detects the first tag "I" that agrees with the noticed symbol "I", from the head to the end of the series of one character tags "I-I-SA-N-GE-N-TE-N-E-NO-KA-I" of the string of search result target words "SEKAI ISAN GENTEN HE NO KAIKI".

Further, the table making unit 61 implements a word set [I-SA: ISAN] by corresponding the corresponding unit "I-SA" provided with the first tag agreeing with the noticed symbol "I" to the noticed word "ISAN", and registers the word sets in the pronunciation symbol-to-word table, as a word set of the string of search result target words "SEKAI ISAN GENTEN HE NO KAIKI".

Thereafter, the table making unit 61 deletes the tag "I" of the corresponding unit "I-SA" corresponding to the noticed word "ISAN" from the series of one character tags "I-I-SA-N-GE-N-TE-N-E-NO-KA-I" of the string of search result target words "SEKAI ISAN GENTEN HE NO KAIKI", and generates a new series of one character tags "SA-N-GE-N-TE-N-E-NO-KA-I".

Thereafter, the table making unit 61, as described above, selects the head first pronunciation symbol "SA", which is not selected as a noticed symbol, from the pronunciation symbol "I-SA-N" of the noticed word "ISAN" and implements a word set for the string of search result target words "SEKAI ISAN GENTEN HE NO KAIKI" by repeating the same process until the tag of the series of one character tags is removed, and registers the word set in the pronunciation symbol-to-word set.

As described above, in the table making unit 61, word sets of all the corresponding units "SE-KA", "KA-I", "I-I", "I-SA", "SA-N", "N-GE", "GE-N", "N-TE", "TE-N", "N-E", "E-NO", "NO-KA", "KA-I", and "I-KI" of the string of search result target word "SEKAI ISAN GENTEN HE NO KAIKI" are implemented, and the word sets are registered in the pronunciation symbol-to-word table.

Further, when a plurality of same (pronunciation symbols of) corresponding units exist in the corresponding units of the string of search result target words "SEKAI ISAN GENTEN HE NO KAIKI", the table making unit 61 merges word sets including the plurality of same corresponding units into one word set, as illustrated in FIG. 11.

That is, in FIG. 13, as in FIG. 11, in the corresponding units "SE-KA", "KA-I", "I-I", "I-SA", "SA-N", "N-GE", "GE-N", "N-TE", "TE-N", "N-E", "E-NO", "NO-KA", "KA-I", and "I-KI" of the string of search result target words "SEKAI ISAN GENTEN HE NO KAIKI", the second corresponding unit "KA-I" and the thirteenth corresponding unit "KA-I" are the same.

Accordingly, the word set [KA-I: SEKAI] including the second corresponding unit "KA-I" and the word set [KA-I: KAIKI] including the thirteenth corresponding unit "KA-I" are merged into one word set [KA-I: SEKAI, KAIKI], and as a result, the corresponding unit "KA-I" is made to correspond to both the words "SEKAI (world)" and "KAIKI".

FIG. 14 is a flowchart illustrating a process of making the pronunciation symbol-to-word table in the second making method.

In step S51, the table making unit 61 takes a morpheme analysis result of a string of noticed words from the morpheme analyzing unit 54 by selecting a string of search result target words where a morpheme analysis result is supplied from the morpheme analyzing unit 54, as the string of noticed words, in the strings of search result target words stored in the search result target storing unit 53, and the process progresses to step S52.

In step S52, the table making unit 61 acquires a string of search result target pronunciation symbols of the string of noticed words (converts the string of noticed words into a string of search result target pronunciation symbols) by acquiring (a string of) pronunciation symbols of the words of the string of noticed words on the basis of the morpheme analysis result of the string of noticed words from the morpheme analyzing unit 54, and arranging the pronunciation symbols.

Further, the table making unit 61 generates a series of corresponding units that is a series of corresponding unit from the string of search result target pronunciation symbols of the string of noticed words, and the process progresses from step S52 to step S53.

In step S53, the table making unit 61 generates a series of one character tags that is a series of arranged tags of the corresponding units, by extracting the first pronunciation symbols, as tags of the corresponding units, from the corresponding units of the series of corresponding units, and the process progresses to step S54.

In step S54, the table making unit 61 selects the head word, which is not selected as a noticed word in the words of the string of noticed words, as a noticed word, and the process progresses to step S55.

In step S55, the table making unit 61 selects one pronunciation symbol that is at the head and not selected as a noticed symbol, from the pronunciation symbols of the noticed word, and the process progresses to step S56.

In step S56, the table making unit 61 detects the first tag agreeing with the noticed symbol, from the head to the end of the series of one character tags of the string of noticed words.

Further, the table making unit 61 implements a word set by matching the corresponding unit provided with the first tag agreeing with the noticed symbol with the noticed word, and registers the word set in the pronunciation symbol-to-word table as a word set for the string of noticed words, and the process progresses from step S56 to step S57.

In step S57, the table making unit 61 generates a new series of one character tags by removing the tag of the corresponding unit corresponding to the noticed word from the series of one character tags of the noticed words, and the process progresses to step S58.

In step S58, the table making unit 61 determines whether there is a pronunciation symbol that is not selected as a noticed symbol, in the pronunciation symbols of the noticed word.

In step S58, when it is determined that there is a pronunciation symbol that is not selected as a noticed symbol, in the pronunciation symbols of the noticed word, the process returns to step S55, and the table making unit 61 selects one pronunciation symbol that is at the head and is not selected as a noticed symbol in the pronunciation symbols of the noticed words, as a noticed symbol, and the same process is repeated.

Further, in step S58, when it is determined that there is no pronunciation symbol that is not selected as a noticed symbol, in the pronunciation symbols of the noticed word, the process progresses to step S59 and the table making unit 61 determines whether there is a word that is not selected as a noticed word, in the words of the string of noticed words.

In step S59, when it is determined there is a word that is not selected as a noticed word in the words of the string of noticed words, the process returns to step S54, and as described above, the head word, which is not selected as a noticed word in the words of the string of noticed words, is selected as noticed word, and the same process is repeated thereafter.

Further, in step S59, it is determined there is no word that is not selected as a noticed word in the words of the string of noticed words, that is, when all of the words of the string of noticed words are selected as noticed words, the process progresses to step S60 and the table making unit 61 merges the words of the string of noticed words registered in the pronunciation symbol-to-word table into word sets.

That is, in step S60, when word sets including the same (pronunciation symbols) corresponding units exist in the word sets of the string of noticed words registered in the pronunciation symbol-to-word table, the table making unit 61 merges the word sets including the same corresponding units into one word set, as illustrated in FIG. 11 and FIG. 13.

Further, the process progresses from step S60 to step S61 while the table making unit 61 determines whether there is a string of search result target words, which is not selected as a string of noticed words, in the strings of search result target words stored in the search result target storing unit 53.

In step S61, when it is determined that there is a string of search result target word, which is not selected as a string of noticed words, in the strings of search result target words stored in the search result target storing unit 53, the table making unit 61 waits for that a morpheme analysis result is supplied from the morpheme analyzing unit 54, returns to step S51, and selects the string of search result target words where the morpheme analysis result is supplied from the morpheme analyzing unit 54 as a string of noticed words, and this process is repeated thereafter.

Further, in step S61, when it is determined that there is no string of search result target words, which is not selected as a string of noticed words, in the strings of search result target words stored in the search result target storing unit 53, that is, when all of the words of the string of search result target words stored in the search result target storing unit 53 are merged into word sets and registered in the pronunciation symbol-to-word table, the process progresses to step S62 and the table making unit 61 outputs the pronunciation symbol-to-word table (to the table storing unit 62), and the process is finished.

FIG. 15 is a view showing another example of a pronunciation symbol-to-word table made by a table making unit 61 of FIG. 2.

In the pronunciation symbol-to-word table of FIG. 10, although two-syllable concatenation composed of two continuous pronunciation symbols is selected as the corresponding unit, in the pronunciation symbol-to-word table of FIG. 15, three-syllable concatenation (continuous three syllables) composed of continuous three pronunciation symbols is selected as the corresponding unit.

In the pronunciation symbol-to-word table of FIG. 15, word sets for a string of search result words "SEKAI ISAN GENTEN HE NO KAIKI (world heritage, back to the starting point)" are registered, and in the word sets, the corresponding units that are three-syllable concatenation correspond to the words in the string of search result target words including at least some of the corresponding words in the pronunciation symbols.

The corresponding unit of the three-syllable concatenation can be acquired in the same way as the two-syllable concatenation, for the string of search result words "SEKAI ISAN GENTEN HE NO KAIKI".

That is, for the string of search result words "SEKAI ISAN GENTEN HE NO KAIKI", the corresponding unit that is the three-syllable concatenation can be acquired by extracting three syllables of a noticed syllable and two syllable right after the noticed syllable while moving back the noticed syllable (pronunciation symbol) back by one syllable, from the head of the pronunciation symbol "SE-KA-I-I-SA-N-GE-N-TE-N-E-NO-KA-I-KI".

For the string of search result words "SEKAI ISAN GENTEN HE NO KAIKI", "SE-KA-I", "KA-I-I", "I-I-SA", "I-SA-N", "SA-N-GE", "N-GE-N", "GE-N-TE", "N-TE-N", "TE-N-E", "N-E-NO", "E-NO-KA", "NO-KA-I", and "KA-I-KI" can be obtained as the corresponding units of three-syllable concatenations.

Further, the pronunciation symbol-to-word table for the string of search result words "SEKAI ISAN GENTEN HE NO KAIKI" can be made by the first making method or the second making method, which is described above.

Further, the numbers S1 of pronunciation symbols that are the corresponding units is necessarily equal to or under the number S2 of pronunciation symbols that is the matching units.

As described above, since the word selecting unit 63 detects a word set including the corresponding unit included in the matching symbol, which is a matching unit of the string of search result words, from the word sets for the string of search result words (string of search result target words) registered in the pronunciation symbol-to-word table, when the number S1 of pronunciation symbols that are the corresponding units is larger than the number S2 of the pronunciation symbols that are the matching units (S1>S2), there is no corresponding unit that is S1 pronunciation symbols included in the match symbols that is S2 pronunciation symbols and not included in the match symbols that are S2 pronunciation symbols, which is less than S1.

[Process of Word Selecting Unit 63]

FIG. 16 is a flowchart illustrating a process that the word selecting unit 63 performs in step S15 of FIG. 9.

The word selecting unit 63 sequentially selects strings of search result words (strings of search result target words of which the degree of similarity is high or the threshold is high) supplied from the generation unit 57 as strings of noticed words, and performs the processes in step S71 and step S73 for the string of noticed words.

That is, the word selecting unit 63, in step S71, acquires the matching unit of pronunciation symbols of the string of noticed words (string of search result target pronunciation symbols) which agrees with the match symbol of the noticed word, that is, the matching unit of the string of recognition result pronunciation symbols, in the matching symbols supplied from the matching unit 56.

Further, the word selecting unit 63, in step S72, detects a word set including the corresponding unit included in the match symbol of the string of noticed words (corresponding unit agreeing with the match symbol, because the numbers of symbols are the same in the matching unit and the corresponding unit in the embodiment) in the word sets, with reference to the word set for the string of search result words (string of search result target words), which is the string of noticed words, in the word sets registered in the pronunciation symbol-to-word table stored in the table storing unit 62.

Further, the word selecting unit 63 selects the words included the word set including the corresponding unit agreeing with the match symbol of the string of noticed words detected from the word set for the string of noticed words, that is, the word corresponding to the corresponding unit agreeing with the match symbol of the string of noticed words, as the emphasis target words that are emphasized in the string of noticed words.

Further, the word selecting unit 63 selects the emphasis target words for all of the match symbols of the string of noticed words, and then in step S73, outputs the emphasis target words to the emphasizing conversion unit 64.

Detailed Example

FIG. 17 is a view showing another example of a pronunciation symbol-to-word table.

In the pronunciation symbol-to-word table of FIG. 17, word sets in which two-syllable concatenations, which is corresponding units for strings of search result target words "The SEKAI ISAN (world heritage)", "SEKAI ISAN GENTEN HE NO KAIKI", and, "SOKUHOU TOSHI NO SE NI KAISAN" and words of a string of search result target words including at least a portion of the corresponding units as pronunciation symbols, are registered.

According to the pronunciation symbol-to-word table of FIG. 17, the following strings of emphasis words can be obtained in the voice search apparatus 10.

That is, it is assumed that a user utters an input voice "TOSHI NO SEKAI ISAN (world heritage in a city)" and correct speech recognition result "TOSHI NO SEKAI ISAN" for the input voice "TOSHI NO SEKAI ISAN" is obtained in the speech recognition unit 51.

Further, it is assumed that strings of search result target words "The SEKAI ISAN", "TANKEN ROMAN SEKAI ISAN ROMA TEIKOKU SHOKUMIN TOSHI (romantic exploration of world heritage, colonial cities in the Roman Empire)", "SEKAI ISAN 100 GIRISHA TOSHI KOKKA (world heritage, 100 Greek city-states)", "The SEKAI ISAN KUUCHUU TOSHI MACHUPICHU (The world heritage, lost city Machu Picchu)", and "SEKAI ISAN KODAI TOSHI TEBE (world heritage, ancient city Thebes)" are selected as strings of search result words for the correct speech recognition result "TOSHI NO SEKAI ISAN" of the input voice "TOSHI NO SEKAI ISAN" in the generation unit 57, and then supplied to the word selecting unit 63 and the emphasis converting unit 64.

For example, when it is assumed that "The SEKAI ISAN" is a string of noticed words, in the strings of search result words (strings of search result target words) "The SEKAI ISAN", "TANKEN ROMAN SEKAI ISAN ROMA TEIKOKU SHOKUMIN TOSHI", "SEKAI ISAN 100 GIRISHA TOSHI KOKKA", "The SEKAI ISAN KUUCHUU TOSHI MACHUPICHU", and "SEKAI ISAN KODAI TOSHI TEBE", the two-syllable concatenation that is the matching unit of the string of noticed words "The SEKAI ISAN" is, "ZA-SE/SE-KA/KA-I/I-I/I-SA/SA-N" (slash "/" shows the section of the matching unit).

Meanwhile, the two-syllable concatenation that is the matching unit for the correct speech recognition result "TOSHI NO SEKAI ISAN" of the input voice "TOSHI NO SEKAI ISAN" becomes, "TO-SHI/SHI-NO/NO-SE/SE-KA/KA-I/I-I/I-SA/SA-N".

Therefore, in the matching unit 56, match units "SE-KA", "KA-I", "I-I", "I-SA", and "SA-N" are obtained as the match symbols that are the matching units agreeing with the matching units "TO-SHI/SHI-NO/NO-SE/SE-KA/KA-I/I-I/I-SA/SA-N" of the correct speech recognition result "TOSHI NO SEKAI ISAN", in the matching units "ZA-SE/SE-KA/KA-I/I-I/I-SA/SA-N" of the string of noticed words "The SEKAI ISAN".

Further, in the pronunciation symbol-to-word table of FIG. 17, the word "SEKAI (world)", the word "SEKAI", the word "ISAN (heritage)", the word "ISAN", and the word "ISAN" correspond to the corresponding unit "SE-KA" agreeing with the match symbol "SE-KA", the corresponding unit "KA-I" agreeing with the match symbol "KA-I", the corresponding unit "I-I" agreeing with the mach symbol "I-I", the corresponding unit "I-SA" agreeing with the match symbol "I-SA", and the corresponding unit "SA-N" agreeing with the match symbol "SA-N", respectively.

Therefore, in the word selecting unit 63, the words "SEKAI" and "ISAN" are selected and supplied to the emphasis converting unit 64, as emphasis target words.

As a result, in the emphasis converting unit 64, the string of noticed words "The SEKAI ISAN" is converted into a string of emphasis words "The SEKAI ISAN" in which the emphasis target words "SEKAI" and "ISAN" are emphasized.

According to the string of emphasis words "The SEKAI ISAN" in which the emphasis target words "SEKAI" and "ISAN" are emphasized, the user can see at a glance that in the string of emphasis words "The SEKAI ISAN", the emphasis target words "SEKAI" and "ISAN" are the parts corresponding to the input voice "TOSHI NO SEKAI ISAN" and the string of emphasis words "The SEKAI ISAN" is the search result, because the pronunciation (sound) of the emphasis target words "SEKAI" and "ISAN" is the same as at least a portion of the pronunciation of the input voice "TOSHI NO SEKAI ISAN".

Therefore, according to the voice search apparatus 10, it is possible to provide convenient search result.

Next, a user utters an input voice "TOSHI NO SEKAI ISAN" and incorrect speech recognition result "TOSHI NO SE KAISAN (dissolution of Diet at the end of year)" for the input voice "TOSHI NO SEKAI ISAN" is obtained in the speech recognition unit 51.

Further, strings of search result target words "The SEKAI ISAN", "TANKEN ROMAN SEKAI ISAN ROMA TEIKOKU SHOKUMIN TOSHI", "SEKAI ISAN 100 GIRISHA TOSHI KOKKA", "The SEKAI ISAN KUUCHUU TOSHI MACHUPICHU", and "SEKAI ISAN KODAI TOSHI TEBE" are selected as strings of search result words for the incorrect speech recognition result "TOSHI NO SE KAISAN" of the input voice "TOSHI NO SEKAI ISAN" in the generation unit 57, and then supplied to the word selecting unit 63 and the emphasis converting unit 64.

For example, when "The SEKAI ISAN" is a string of noticed words, in the strings of search result words (strings of search result target words) "The SEKAI ISAN", "TANKEN ROMAN SEKAI ISAN ROMA TEIKOKU SHOKUMIN TOSHI", "SEKAI ISAN 100 GIRISHA TOSHI KOKKA", "The SEKAI ISAN KUUCHUU TOSHI MACHUPICHU", and "SEKAI ISAN KODAI TOSHI TEBE", the two-syllable concatenation that is the matching unit of the string of noticed words "The SEKAI ISAN" is, "ZA-SE/SE-KA/KA-I/I-I/I-SA/SA-N", as described above.

Meanwhile, the two-syllable concatenation that is the matching unit of the incorrect speech recognition result "TOSHI NO SE KAISAN" of the input voice "TOSHI NO SEKAI ISAN" becomes "TO-SHI/SHI-NO/NO-SE/SE-KA/KA-I/I-SA/SA-N".

Therefore, in the matching unit 56, match units "SE-KA", "KA-I", "I-SA", and "SA-N" are obtained as the match symbols that is the matching units agreeing with the matching units "TO-SHI/SHI-NO/NO-SE/SE-KA/KA-I/I-SA/SA-N" of the incorrect speech recognition result "TOSHI NO SE KAISAN", in the matching units "ZA-SE/SE-KA/KA-I/I-I/I-SA/SA-N" of the string of noticed words "The SEKAI ISAN".

Further, in the pronunciation symbol-to-word table of FIG. 17, the word "SEKAI", the word "SEKAI", the word "ISAN", and the word "ISAN" to the corresponding unit "SE-KA" agreeing with the match symbol "SE-KA", the corresponding unit "KA-I" agreeing with the match symbol "KA-I", the corresponding unit "I-SA" agreeing with the mach symbol "I-SA", the corresponding unit "SA-N" agreeing with the match symbol "SA-N", respectively.

Therefore, in the word selecting unit 63, the words "SEKAI" and "ISAN" are selected and supplied to the emphasis converting unit 64, as emphasis target words.

As a result, in the emphasis converting unit 64, the string of noticed words "The SEKAI ISAN" is converted into a string of emphasis words "The SEKAI ISAN" in which the emphasis target words "SEKAI" and "ISAN" are emphasized.

According to the string of emphasis words "The SEKAI ISAN" in which the emphasis target words "SEKAI" and "ISAN" are emphasized, the user can see at a glance that in the string of emphasis words "The SEKAI ISAN", the emphasis target words "SEKAI" and "ISAN" are the parts corresponding to the input voice "TOSHI NO SEKAI ISAN" and the string of emphasis words "The SEKAI ISAN" is the search result, because the pronunciation of the emphasis target words "SEKAI" and "ISAN" are the same as at least a portion of the pronunciation of the input voice "TOSHI NO SEKAI ISAN".

Further, for the input voice "TOSHI NO SEKAI ISAN", even if an incorrect speech recognition result "TOSHI NO SE KAISAN" is obtained, a string of search result target words "The SEKAI ISAN" of which the pronunciation is at least partially the same as the input voice "TOSHI NO SEKAI ISAN" can be obtained as the search result (string of search result words).

Therefore, according to the voice search result 10, it is possible to prevent the string of words corresponding to the input voice from being outputted as a string of search result words due to incorrect speech recognition, and provides convenient search result.

Next, it is assumed that a user utters an input voice "TOSHI NO SEKAI ISAN" and incorrect speech recognition result "TOSHI NO SE KAISAN" for the input voice "TOSHI NO SEKAI ISAN" is obtained in the speech recognition unit 51.

Further, for the incorrect speech recognition result "TOSHI NO SE KAISAN" of the input voice "TOSHI NO SEKAI ISAN", in the generation unit 57, the string of search result target words "SEKAI ISAN GENTEN HE NO KAIKI (world heritage, back to the starting point)" is selected as a string of search result words and supplied to the word selecting unit 63 and the emphasis converting unit 64.

When the string of search result words (string of search result target words) "SEKAI ISAN GENTEN HE NO KAIKI" is a string of noticed words, the two-syllable concatenation that is the matching unit of the string of noticed words "SEKAI ISAN GENTEN HE NO KAIKI" becomes "SE-KA/KA-I/I-I/I-SA/SA-N/N-GE/GE-N/N-TE/TE-N/N-E/E-NO/NO-KA/K A-I/I-KI".

Meanwhile, the two-syllable concatenation that is the matching unit of the incorrect speech recognition result "TOSHI NO SE KAISAN" of the input voice "TOSHI NO SEKAI ISAN" becomes "TO-SHI/SHI-NO/NO-SE/SE-KA/KA-I/I-SA/SA-N".

Therefore, in the matching unit 56, match units "SE-KA", "KA-I", "I-SA", and "SA-N" are obtained as the match symbols that is the matching units agreeing with the matching units "TO-SHI/SHI-NO/NO-SE/SE-KA/KA-I/I-SA/SA-N" of the incorrect speech recognition result "TOSHI NO SE KAISAN", in the matching units "SE-KA/KA-I/I-I/I-SA/SA-N/N-GE/GE-N/N-TE/TE-N/N-E/E-NO/NO-KA/K A-I/I-KI" of the string of noticed words "SEKAI ISAN GENTEN HE NO KAIKI".

Further, in the pronunciation symbol-to-word table of FIG. 17, the word "SEKAI", the two words "SEKAI" and "KAIKI (back to)", the word "ISAN (heritage)", and the word "ISAN" correspond to the corresponding unit "SE-KA" agreeing with the match symbol "SE-KA", the corresponding unit "KA-I" agreeing with the match symbol "KA-I", the corresponding unit "I-SA" agreeing with the mach symbol "I-SA", the corresponding unit "SA-N" agreeing with the match symbol "SA-N", respectively, in the string of noticed words "SEKAI ISAN GENTEN HE NO KAIKI"

Therefore, in the word selecting unit 63, the words "SEKAI (world)", "ISAN", and "KAIKI" are selected and supplied to the emphasis converting unit 64, as emphasis target words.

As a result, in the emphasis converting unit 64, the string of noticed words "SEKAI ISAN GENTEN HE NO KAIKI" is converted into a string of emphasis words "SEKAI ISAN GENTEN HE NO KAIKI" in which the emphasis target words "SEKAI", "ISAN", and "KAIKI" are emphasized.

According to the string of emphasis words "SEKAI ISAN GENTEN HE NO KAIKI" in which the emphasis target words "SEKAI", "ISAN", and "KAIKI" are emphasized, the user can see at a glance that in the string of emphasis words "SEKAI ISAN GENTEN HE NO KAIKI", the emphasis target words "SEKAI", "ISAN", and "KAIKI" are the parts corresponding to the input voice "TOSHI NO SEKAI ISAN" and the string of emphasis words "SEKAI ISAN GENTEN HE NO KAIKI" is the search result, because the pronunciations of the emphasis target words "SEKAI", "ISAN", and "KAIKI" are the same as at least a portion of the pronunciation of the input voice "TOSHI NO SEKAI ISAN".

Further, for the input voice "TOSHI NO SEKAI ISAN", even if an incorrect speech recognition result "TOSHI NO SE KAISAN" is obtained, a string of search result target words "SEKAI ISAN GENTEN HE NO KAIKI" of which the pronunciation is at least partially the same as that of the input voice "TOSHI NO SEKAI ISAN" can be obtained as the search result (string of search result words).

Therefore, according to the voice search apparatus 10, it is possible to prevent the string of words corresponding to the input voice from not being output as a string of search result words due to incorrect speech recognition, and provide a convenient search result.

Next, it is assumed that a user utters an input voice "TOSHI NO SEKAI ISAN" and correct speech recognition result "TOSHI NO SEKAI ISAN" for the input voice "TOSHI NO SEKAI ISAN" is obtained in the speech recognition unit 51.

Further, for the correct speech recognition result "TOSHI NO SEKAI ISAN" of the input voice "TOSHI NO SEKAI ISAN", in the generation unit 57, the string of search result target words "SOKUHOU TOSHI NO SE NI KAISAN (a news flash; Congress will be dissolved at the end of year)" is selected as a string of search result words by the generation unit 57 and supplied to the word selecting unit 63 and the emphasis converting unit 64.

When it is assumed that the string of search result words (string of search result target words) "SOKUHOU TOSHI NO SE NI KAISAN" is a string of noticed words, the two-syllable concatenation that is the matching unit of the string of noticed words) "SOKUHOU TOSHI NO SE NI KAISAN" becomes "SO-KU/KU-HO/HO-U/U-TO/TO-SHI/SHI-NO/NO-SE/SE-NI/NI-KA/KA-I/I-SA/SA-N".

Meanwhile, the two-syllable concatenation that is the matching unit of the correct speech recognition result "TOSHI NO SEKAI ISAN" of the input voice "TOSHI NO SEKAI ISAN" becomes "TO-SHI/SHI-NO/NO-SE/SE-KA/KA-I/I-I/I-SA/SA-N".

Therefore, in the matching unit 56, matching units "TO-SHI", "SHI-NO", "NO-SE", "KA-I", "I-SA", "SA-N" are obtained as the match symbols that are the matching units agreeing with the matching units "TO-SHI/SHI-NO/NO-SE/SE-KA/KA-I/I-I/I-SA/SA-N" of the correct speech recognition result "TOSHI NO SEKAI ISAN", in the matching units "SO-KU/KU-HO/HO-U/U-TO/TO-SHI/SHI-NO/NO-SE/SE-NI/NI-KA/KA-I/I-SA/SA-N" of the string of noticed words "SOKUHOU TOSHI NO SE NI KAISAN".

Further, in the pronunciation symbol-to-word table of FIG. 17, the word "TOSHI NO SE", the word "TOSHI NO SE", the word "TOSHI NO SE", the word "KAISAN", the word "KAISAN", and the word "KAISAN" are made to correspond to the corresponding unit "TO-SHI" agreeing with the match symbol "TO-SHI", the corresponding unit "SHI-NO" agreeing with the match symbol "SHI-NO", the corresponding unit "NO-SE" agreeing with the mach symbol "NO-SE", the corresponding unit "KA-I" agreeing with the match symbol "KA-I", the corresponding unit "I-SA" agreeing with the match symbol "I-SA", and the corresponding unit "SA-N" agreeing with the match symbol "SA-N", respectively, in the string of noticed words "SOKUHOU TOSHI NO SE NI KAISAN".

Therefore, in the word selecting unit 63, the words "TOSHI NO SE" and "KAISAN" are selected and supplied to the emphasis converting unit 64, as emphasis target words.

As a result, in the emphasis converting unit 64, the string of noticed words "SOKUHOU TOSHI NO SE NI KAISAN" is converted into "SOKUHOU TOSHI NO SE NI KAISAN" in which the emphasis target words "TOSHI NO SE" and "KAISAN" are emphasized.

According to the string of emphasis words "SOKUHOU TOSHI NO SE NI KAISAN" in which the emphasis target words "TOSHI NO SE" and "KAISAN" are emphasized, the user can see at a glance that in the string of emphasis words "SOKUHOU TOSHI NO SE NI KAISAN", the emphasis target words "TOSHI NO SE" and "KAISAN" are the parts corresponding to the input voice "TOSHI NO SEKAI ISAN" and the string of emphasis words "SOKUHOU TOSHI NO SE NI KAISAN" is the search result, because the pronunciation of the emphasis target words "TOSHI NO SE" and "KAISAN" are the same as at least a portion of the pronunciation of the input voice "TOSHI NO SEKAI ISAN".

That is, in the matching unit 56, matching using the pronunciation symbols is performed, but in the matching using the pronunciation symbols, the degree of similarity of the string of search result target words "SOKUHOU TOSHI NO SE NI KAISAN" of which the notation is not similar but the pronunciation is similar to the speech recognition result "TOSHI NO SEKAI ISAN" is large, such that the string of search result target words "SOKUHOU TOSHI NO SE NI KAISAN" may be selected as a string of search result words.

In this case, when the string of search result words (string of search result target words) "SOKUHOU TOSHI NO SE NI KAISAN" is displayed without being emphasized, the user does not know the reason that the string of search result words "SOKUHOU TOSHI NO SE NI KAISAN" that is completely different in notation from the input voice "TOSHI NO SEKAI ISAN" at all is searched for the input voice "TOSHI NO SEKAI ISAN" and may feels stress.

Meanwhile, in the voice search apparatus 10, as described above, the string of search result words "SOKUHOU TOSHI NO SE NI KAISAN" is converted into "SOKUHOU TOSHI NO SE NI KAISAN" in which the emphasis target words "TOSHI NO SE" and "KAISAN" are emphasized, such that the string of search result words "SOKUHOU TOSHI NO SE NI KAISAN" is displayed with the words "TOSHI NO SE" and "KAISAN" emphasized.

In this case, the user can easily see the reason that the string of search result words "SOKUHOU TOSHI NO SE NI KAISAN" is searched for the input voice "TOSHI NO SEKAI ISAN" because the pronunciation "TO-SHI-NO-SE" of the "TOSHI NO SE" emphasized in the display of the string of search result words "SOKUHOU TOSHI NO SE NI KAISAN" agrees with "TO-SHI-NO-SE" in the pronunciation "TO-SHI-NO-SE-KA-I-SA-N" of the input voice "TOSHI NO SEKAI ISAN" and the pronunciation "KA-I-SA-N" of "KAISAN" emphasized in the display of the string of search result words "SOKUHOU TOSHI NO SE NI KAISAN" nearly agrees with "KA-I-I-SA-N" of the pronunciation "TO-SHI-NO-SE-KA-I-I-SA-N" of the input voice "TOSHI NO SEKAI ISAN".

FIG. 18 and FIG. 19 are view showing a display example of a string of search result words (string of search result target words).

That is, FIG. 18 and FIG. 19 show a display example of a string of search result words when a correct speech recognition result "IITOMO (TV program title)" is obtained for an input voice "I-I-TO-MO".

FIG. 18 shows a display example when the emphasis target words are not emphasized, while FIG. 19 shows a display example when the emphasis target words are emphasized.

In FIG. 19, the emphasis target words are emphasized by circles.

It can be seen from FIG. 18 and FIG. 19 that by emphasizing the emphasis target words, the user can easily seen the reason that the strings of search result words are searched for an input voice "I-I-TO-MO", and can quickly find the strings of search result words that agrees in notation with the input voice "I-I-TO-MO" that is the desired (high-possible) search result, because the user can easily concentrate on the emphasis target words.

[Description of Computer Using the Present Disclosure]

The series of processes described above may be implemented by hardware or software. When the series of processes is implemented by software, a program for the software is installed in a common computer.

FIG. 20 shows an example of the configuration of an embodiment of a computer where a program executing the series of processes is installed.

The program may be recorded on a hard disk 105, as a recording medium, disposed in the computer, or a ROM 103.

Alternatively, the program may be stored (recorded) on a removable recording medium 111. The removable recording medium 111 may be provided as so-called package software. As the removable recording medium 111, for example, there are a flexible disk, a CD-ROM (Compact Disc Read Only Memory), an MO (Magneto Optical) disk, a DVD (Digital Versatile Disc), a magnetic disk, and a semiconductor memory or the like.

Further, the program may be installed on the built-in hard disk 105 by being downloaded onto the computer through a communication network or a broadcasting network, in addition to being installed in the computer from the removable recording medium 111. That is, the program, for example, may be transmitted in wirelessly to the computer through a satellite for digital satellite broadcasting, or may be transmitted by wire to the computer through LAN (Local Area Network) or Internet.

The computer includes a CPU (Central Processing Unit) 102 and the CPU 102 is connected with an input/output interface 110 through a bus 101.

When a command is input when a user operates an input unit 107 through the input/output interfaced 110, the CPU 102 executes the programs stored on the ROM (Read Only Memory) 103. Alternatively, the CPU 102 loads and executes the program stored in the hard disk 105 to the RAM (Random Access Memory) 104.

Therefore, the CPU 102 performs the process according to the flowchart described above or the process performed by the configuration of the block diagram described above. Further, the CPU 102 outputs the process results from an output unit 106, transmits the process results from a communication unit 108, or records the process result on the hard disk 105, through the input/output interface 110, if necessary.

Further, the input unit 107 is composed of a keyboard, a mouse, and a microphone or the like. Further, the output unit 106 is composed of an LCD (Liquid Crystal Display) or a speaker.

In the specification, the processes that the computer performs in accordance with the program are not necessarily performed in the time sequence in accordance with the order shown in the flowchart. That is, the processes that the computer performs in accordance with the program include processes that are performed in parallel or individually (for example, parallel processes or processes by objects).

Further, the program may be executed by one computer (processor) or may be distributed and executed by a plurality of computers. Further, the program may be transmitted and executed in a remote computer.

Further, the embodiments of the present disclosure are not limited to those described above and may be modified in various ways without departing from the scope of the present disclosure.

That is, for example, the voice search apparatus 10 (FIG. 2) may be entire or partially mounted on a network, such as Internet.

In detail, for example, the voice search apparatus 10 may be entirely or partially mounted on a server, receive an input voice from a client terminal, and provide a string of emphasis words output from the emphasis converting unit 64, for the input voice, to the client terminal as the search result of the voice search.

Further, for example, according to the voice search apparatus 10, the speech recognition unit 51 is mounted on the client terminal, the parts other than the speech recognition unit 51 are performed in the server, the client terminal recognizes an input voice and transmits the speech recognition result to the server, the server receives the speech recognition result from the client terminal, and provides the string of emphasis words output from the emphasis converting unit 64, for the speech recognition result, to the client terminal, as the search result of the voice search.

It should be understood by those skilled in the art that various modifications, combinations, sub-combinations and alterations may occur depending on design requirements and other factors insofar as they are within the scope of the appended claims or the equivalents thereof.

What is claimed is:

1. A search apparatus, comprising:
    a speech recognition unit that recognizes an input voice;
    a matching unit that matches symbol units from one or more lines of pronunciation symbols derived from a string of search result target words with symbol units from one or more lines of pronunciation symbols derived from a speech recognition result of an input voice,
    wherein each line of pronunciation symbols of the string of search result target words is a line of syllables extracted from the string of search result target words and each string of pronunciation symbols of the speech recognition result is a line of syllables extracted from the speech recognition result of the input voice upon the result of matching the symbol units from such lines of pronunciation symbols of the string of search result target words with the symbol units from such lines of pronunciation symbols of the speech recognition result producing a highest degree of similarity, and
    each line of pronunciation symbols of the string of search result target words is a line of two-syllable concatenations formed by pairing adjacent ones of the syllables extracted from the string of search result target words, such that each syllable extracted from the string of search result target words is paired with its immediately preceding extracted syllable in a particular one of the line of two-syllable concatenations and is paired with its immediately succeeding extracted syllable in a next one of the line of two-syllable concatenations, and each string of pronunciation symbols of the speech recognition result is a line of two-syllable concatenations formed by pairing adjacent ones of the syllables extracted from the speech recognition result of the input voice, such that each syllable extracted from the speech recognition result is paired with its immediately preceding extracted syllable in a given one of the further line of two-syllable concatenations and is paired with its immediately succeeding extracted syllable in a next one of the further line of two-syllable concatenations, upon the result of matching the symbol units from such lines of pronunciation symbols of the string of search result target words with the symbol units from such lines of pronunciation symbols of the speech recognition result producing the highest degree of similarity;
    a generation unit that generates a string of search result words based on the result of matching the symbol units from the one or more lines of pronunciation symbols of the string of search result target words with the symbol units from the one or more lines of pronunciation symbols of the speech recognition result;
    a selecting unit that selects words to be emphasized in the string of search result words based on a matching result of one or more lines of pronunciation symbols of the string of search result words and a pronunciation symbol-to-word table in which the pronunciation symbols correspond to the emphasis target words; and
    a conversion unit that converts the string of search result words into a string of emphasis words in which the emphasis target words are emphasized in the string of search result words.

2. The search apparatus according to claim 1, wherein the pronunciation symbols of the string of search result words correspond to the words of the string of search result words in the pronunciation symbol-to-word table.

3. The search apparatus according to claim 2, wherein the selecting unit selects the words corresponding to the matching symbols as the emphasis target words in the pronunciation symbol-to-word table based on the symbols of the string of search result target pronunciation symbols which are in the matching result.

4. The search apparatus according to claim 3, wherein the selecting unit selects the words corresponding to the matching symbols as the emphasis target words in the pronunciation symbol-to-word table.

5. The search apparatus according to claim 4, further comprising:

a table making unit that makes the pronunciation symbol-to-word table by corresponding the units of two or more continuous pronunciation symbols in the string of search result target pronunciation symbols to the words of the string of search result target words for each of a plurality of search result target words.

6. The search apparatus according to claim 2, wherein the generation unit implements the string of search result target words of which the degree of similarity is above a predetermined threshold value or the string of search result target words of which the degree of similarity is high, as the string of search result words.

7. In a search apparatus for searching a string of words corresponding to an input voice, a search method comprising:
recognizing an input voice;
matching symbol units from one or more lines of pronunciation symbols derived from a string of search result target words with symbol units from one or more lines of pronunciation symbols derived from a speech recognition result of an input voice,
wherein each line of pronunciation symbols of the string of search result target words is a line of syllables extracted from the string of search result target words and each string of pronunciation symbols of the speech recognition result is a line of syllables extracted from the speech recognition result of the input voice upon the result of matching the symbol units from such lines of pronunciation symbols of the string of search result target words with the symbol units from such lines of pronunciation symbols of the speech recognition result producing a highest degree of similarity, and
each line of pronunciation symbols of the string of search result target words is a line of two-syllable concatenations formed by pairing adjacent ones of the syllables extracted from the string of search result target words, such that each syllable extracted from the string of search result target words is paired with its immediately preceding extracted syllable in a particular one of the line of two-syllable concatenations and is paired with its immediately succeeding extracted syllable in a next one of the line of two-syllable concatenations, and each string of pronunciation symbols of the speech recognition result is a line of two-syllable concatenations formed by pairing adjacent ones of the syllables extracted from the speech recognition result of the input voice, such that each syllable extracted from the speech recognition result is paired with its immediately preceding extracted syllable in a given one of the further line of two-syllable concatenations and is paired with its immediately succeeding extracted syllable in a next one of the further line of two-syllable concatenations, upon the result of matching the symbol units from such lines of pronunciation symbols of the string of search result target words with the symbol units from such lines of pronunciation symbols of the speech recognition result producing the highest degree of similarity;
generating a string of search result words based on the result of matching the units from the one or more lines of pronunciation symbols of the string of search result target words with the units from the one or more lines of pronunciation symbols of the speech recognition result;
selecting words to be emphasized in the string of search result words based on a matching result of one or more lines of pronunciation symbols of the string of search result words and a pronunciation symbol-to-word table in which the pronunciation symbols correspond to the emphasis target words; and
converting the string of search result words into a string of emphasis words in which the emphasis target words are emphasized in the string of search result words.

8. A non-transitory recording medium in which a computer program is recorded that causes a computer to function as:
a speech recognition unit that recognizes an input voice;
a matching unit that matches symbol units from one or more lines of pronunciation symbols derived from a string of search result target words with symbol units from one or more lines of pronunciation symbols derived from a speech recognition result of an input voice,
wherein each line of pronunciation symbols of the string of search result target words is a line of syllables extracted from the string of search result target words and each string of pronunciation symbols of the speech recognition result is a line of syllables extracted from the speech recognition result of the input voice upon the result of matching the symbol units from such lines of pronunciation symbols of the string of search result target words with the symbol units from such lines of pronunciation symbols of the speech recognition result producing a highest degree of similarity, and
each line of pronunciation symbols of the string of search result target words is a line of two-syllable concatenations formed by pairing adjacent ones of the syllables extracted from the string of search result target words, such that each syllable extracted from the string of search result target words is paired with its immediately preceding extracted syllable in a particular one of the line of two-syllable concatenations and is paired with its immediately succeeding extracted syllable in a next one of the line of two-syllable concatenations, and each string of pronunciation symbols of the speech recognition result is a line of two-syllable concatenations formed by pairing adjacent ones of the syllables extracted from the speech recognition result of the input voice, such that each syllable extracted from the speech recognition result is paired with its immediately preceding extracted syllable in a given one of the further line of two-syllable concatenations and is paired with its immediately succeeding extracted syllable in a next one of the further line of two-syllable concatenations, upon the result of matching the symbol units from such lines of pronunciation symbols of the string of search result target words with the symbol units from such lines of pronunciation symbols of the speech recognition result producing the highest degree of similarity;
a generation unit that generates a string of search result words, based on the result of matching the units from the one or more lines of pronunciation symbols of the string of search result target words with the units from the one or more lines of pronunciation symbols of the speech recognition result;
a selecting unit that selects words to be emphasized in the string of search result words based on a matching result of one or more lines of pronunciation symbols of the string of search result words and a pronunciation symbol-to-word table in which the pronunciation symbols correspond to the emphasis target words; and
a conversion unit that converts the string of search result words into a string of emphasis words in which the emphasis target words are emphasized in the string of search result words.

9. A search apparatus, comprising:
a matching unit that matches symbol units from one or more lines of pronunciation symbols derived from a string of search result target words with symbol units from one or more lines of pronunciation symbols derived from a speech recognition result of an input voice input to a client terminal, wherein each line of pronunciation symbols of the string of search result target words is a line of syllables extracted from the string of search result target words and each string of pronunciation symbols of the speech recognition result is a line of syllables extracted from the speech recognition result of the input voice upon the result of matching the symbol units from such lines of pronunciation symbols of the string of search result target words with the symbol units from such lines of pronunciation symbols of the speech recognition result producing a highest degree of similarity, and each line of pronunciation symbols of the string of search result target words is a line of two-syllable concatenations formed by pairing adjacent ones of the syllables extracted from the string of search result target words, such that each syllable extracted from the string of search result target words is paired with its immediately preceding extracted syllable in a particular one of the line of two-syllable concatenations and is paired with its immediately succeeding extracted syllable in a next one of the line of two-syllable concatenations, and each string of pronunciation symbols of the speech recognition result is a line of two-syllable concatenations formed by pairing adjacent ones of the syllables extracted from the speech recognition result of the input voice, such that each syllable extracted from the speech recognition result is paired with its immediately preceding extracted syllable in a given one of the further line of two-syllable concatenations and is paired with its immediately succeeding extracted syllable in a next one of the further line of two-syllable concatenations, upon the result of matching the symbol units from such lines of pronunciation symbols of the string of search result target words with the symbol units from such lines of pronunciation symbols of the speech recognition result producing the highest degree of similarity;

a generation unit that generates a string of search result words, based on the result of matching the units from the one or more lines of pronunciation symbols of the string of search result target words with the units from the one or more lines of pronunciation symbols of the speech recognition result;

a selecting unit that selects words to be emphasized in the string of search result words based on a matching result of one or more lines of pronunciation symbols of the string of search result words and a pronunciation symbol-to-word table in which the pronunciation symbols correspond to the emphasis target words; and a conversion unit that converts the string of search result words into a string of emphasis words in which the emphasis target words are emphasized in the string of search result words.

* * * * *